(12) United States Patent
Young

(10) Patent No.: US 7,748,420 B2
(45) Date of Patent: Jul. 6, 2010

(54) DADOING SYSTEM

(76) Inventor: Steven Palmer Young, 940 Bacacita Farms Rd., Abilene, TX (US) 79602

( * ) Notice: Subject to any disclaimer, the term of this patent is extended or adjusted under 35 U.S.C. 154(b) by 523 days.

(21) Appl. No.: 11/563,107

(22) Filed: Nov. 24, 2006

(65) Prior Publication Data

US 2008/0121311 A1 May 29, 2008

(51) Int. Cl.
B27C 5/00 (2006.01)
(52) U.S. Cl. ............ 144/144.52; 33/427; 33/474; 33/481; 409/130; 409/225
(58) Field of Classification Search ............ 144/144.1, 144/144.52, 145.1–145.3, 154, 409, 125, 144/130; 409/175, 130, 225; 33/427, 474, 33/481, 638, 562, 563, 566
See application file for complete search history.

(56) References Cited

U.S. PATENT DOCUMENTS

| | | | |
|---|---|---|---|
| 3,770,031 A | 11/1973 | Olson | |
| 3,782,431 A | 1/1974 | Cox | |
| 3,827,326 A | 8/1974 | Martin | |
| 3,827,468 A | 8/1974 | Markham | |
| 4,197,775 A * | 4/1980 | Handler et al. | 83/471.3 |
| 4,215,731 A | 8/1980 | Maynard | |
| 4,630,656 A | 12/1986 | Collins | |
| 4,770,216 A | 9/1988 | Ruscak | |
| 4,966,507 A * | 10/1990 | Hanks | 409/175 |
| 5,203,389 A | 4/1993 | Goodwin | |
| 5,285,831 A | 2/1994 | Woolgar | |
| 5,533,556 A | 7/1996 | Whitney | |
| 5,682,934 A | 11/1997 | Rybski | |
| 5,738,470 A | 4/1998 | Sugita | |
| 6,557,601 B1 * | 5/2003 | Taylor | 144/253.1 |
| 6,705,810 B1 | 3/2004 | Sugita | |
| 2005/0073203 A1 * | 4/2005 | Harris | 310/10 |

* cited by examiner

Primary Examiner—Dana Ross
Assistant Examiner—Matthew G Katcoff

(57) ABSTRACT

A dadoing system that can be set up to cut multiple dados in a workpiece. The dadoing system uses a sliding channel clamp to keep the workpiece from moving in a transverse direction, while the dados are being cut into the workpiece. The sliding guide rails are used to put downward pressure on a workpiece while guiding a router across the workpiece during the dadoing process. Once the system is set up to cut the dados in the desired locations on the workpiece, the sliding guide rail stops can be secured into place. The stops will insure that the sliding guide rails are set up in the same place thus allowing multiple workpieces to have matching dados that line up properly during assembly.

20 Claims, 36 Drawing Sheets

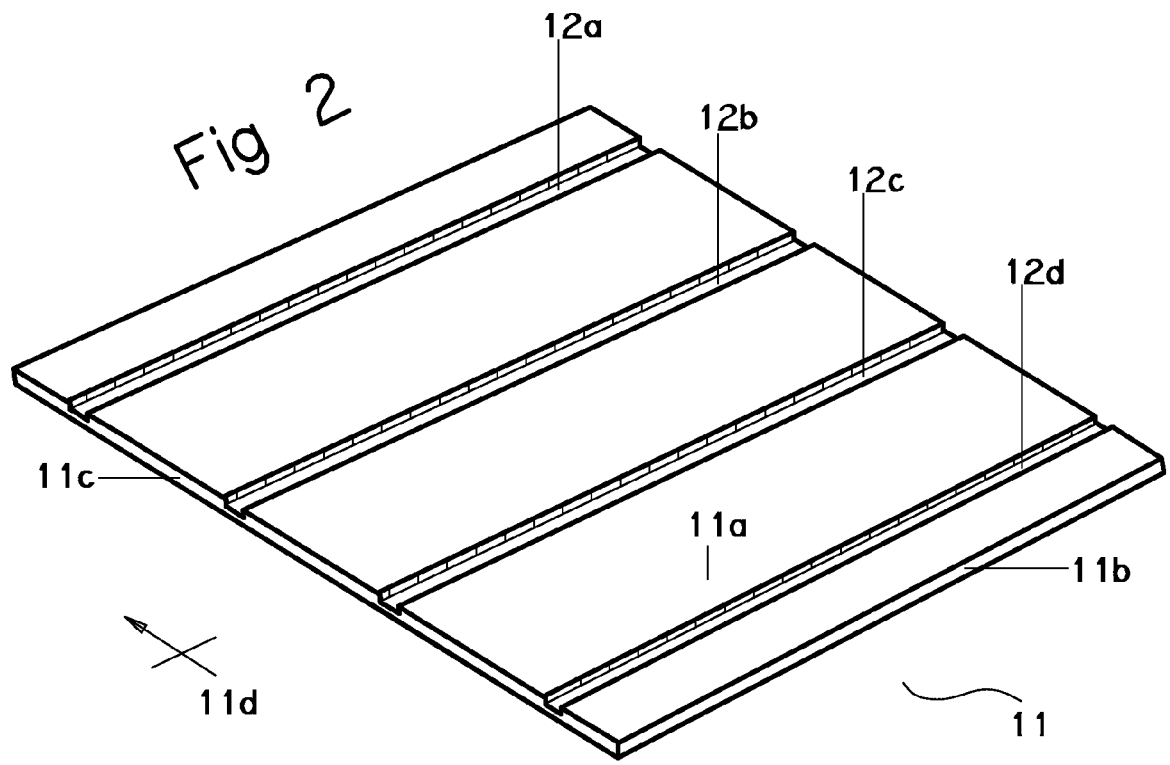
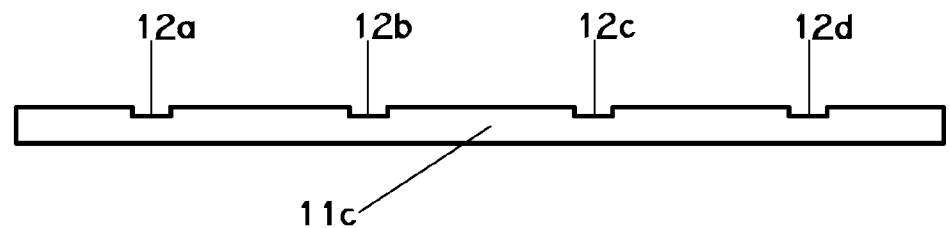

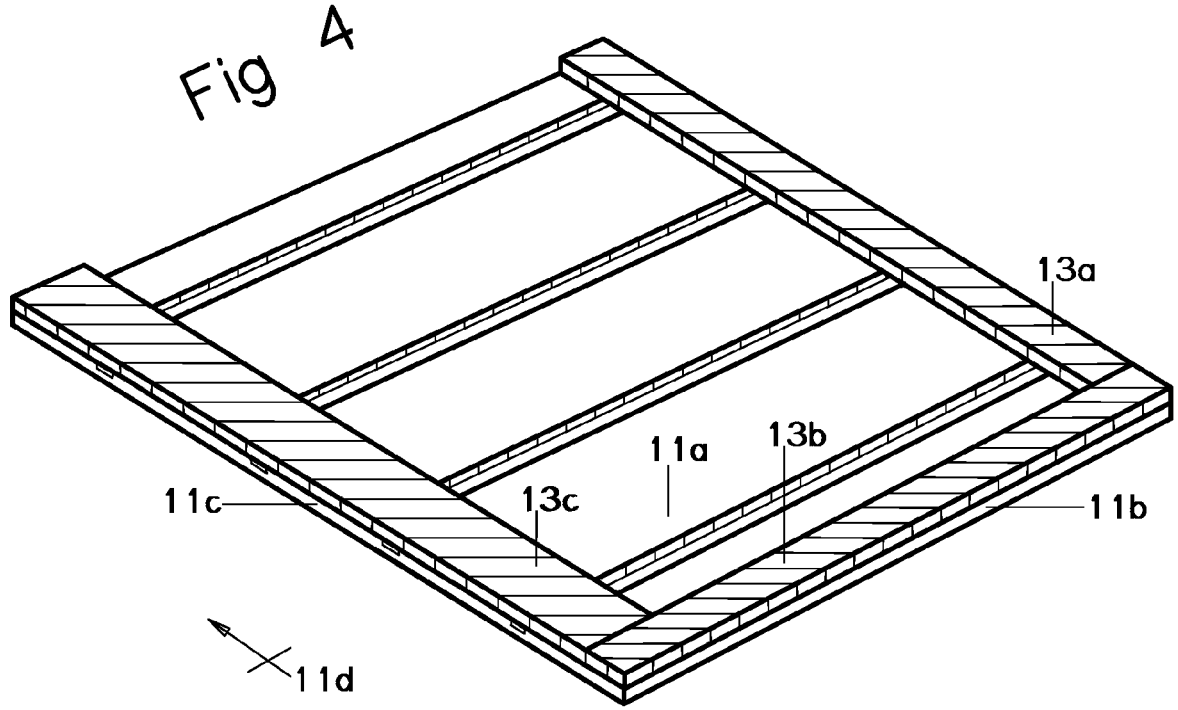
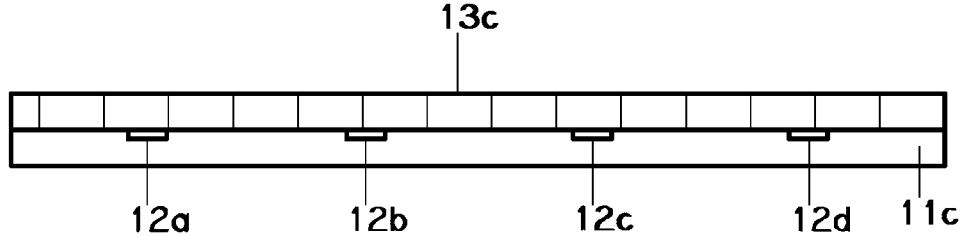

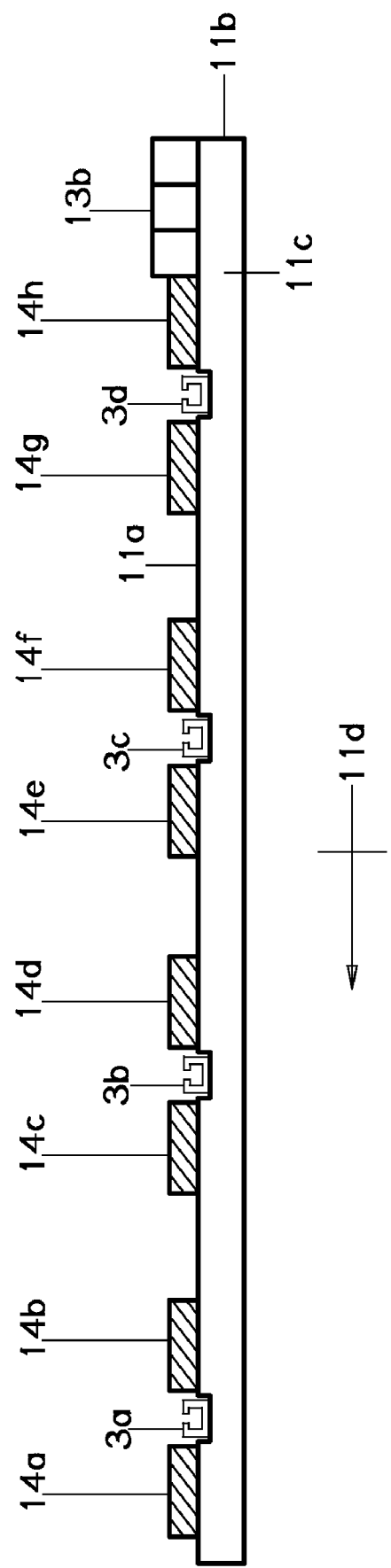

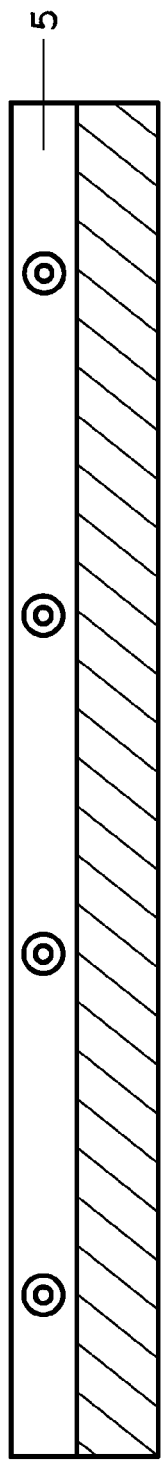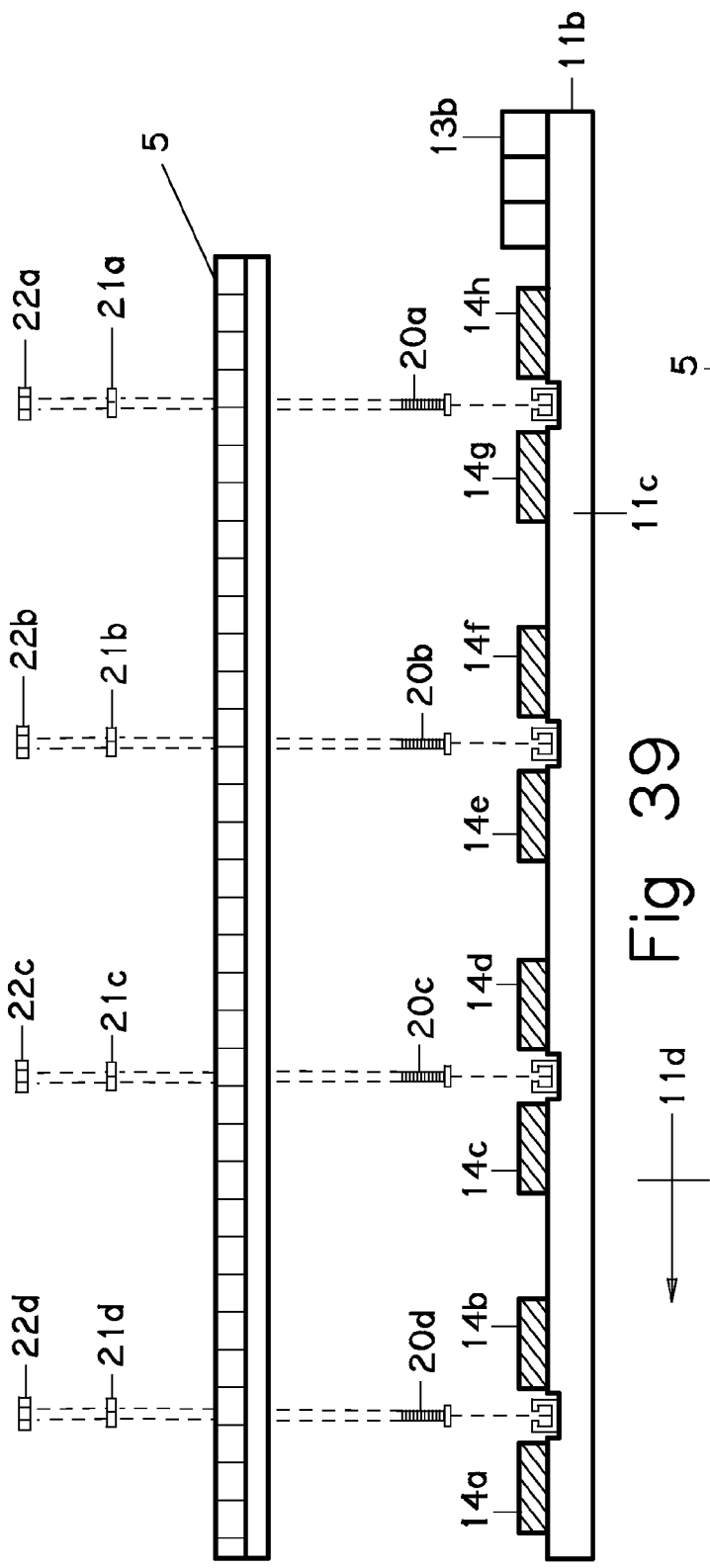

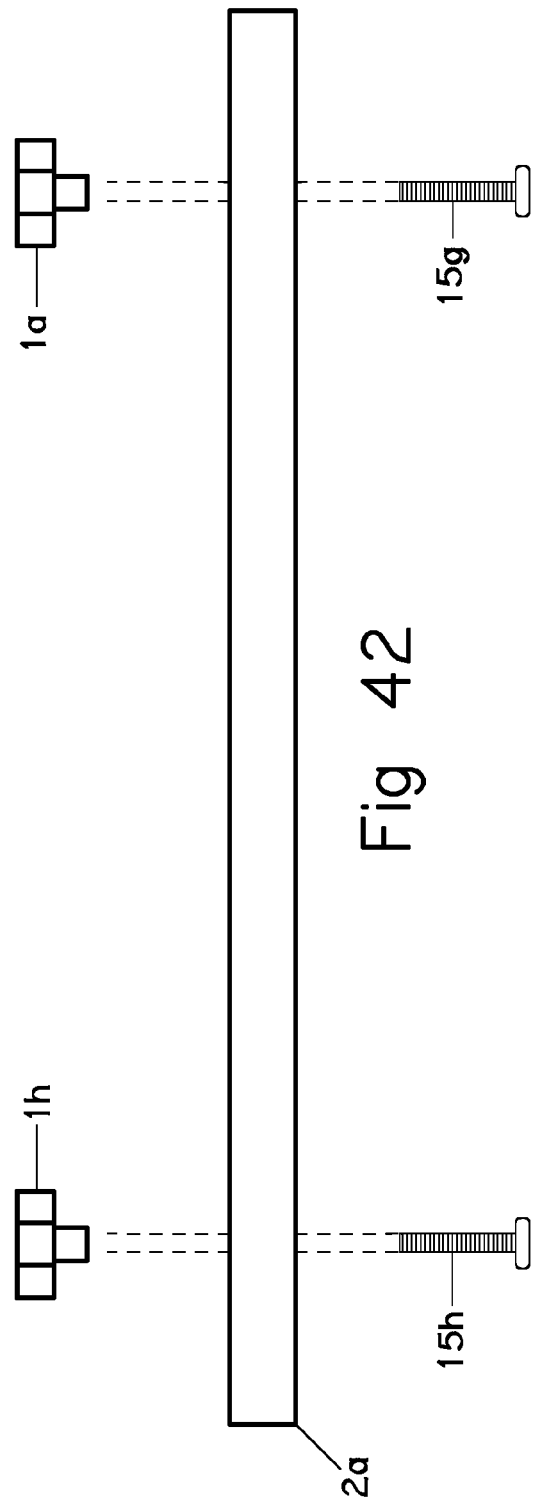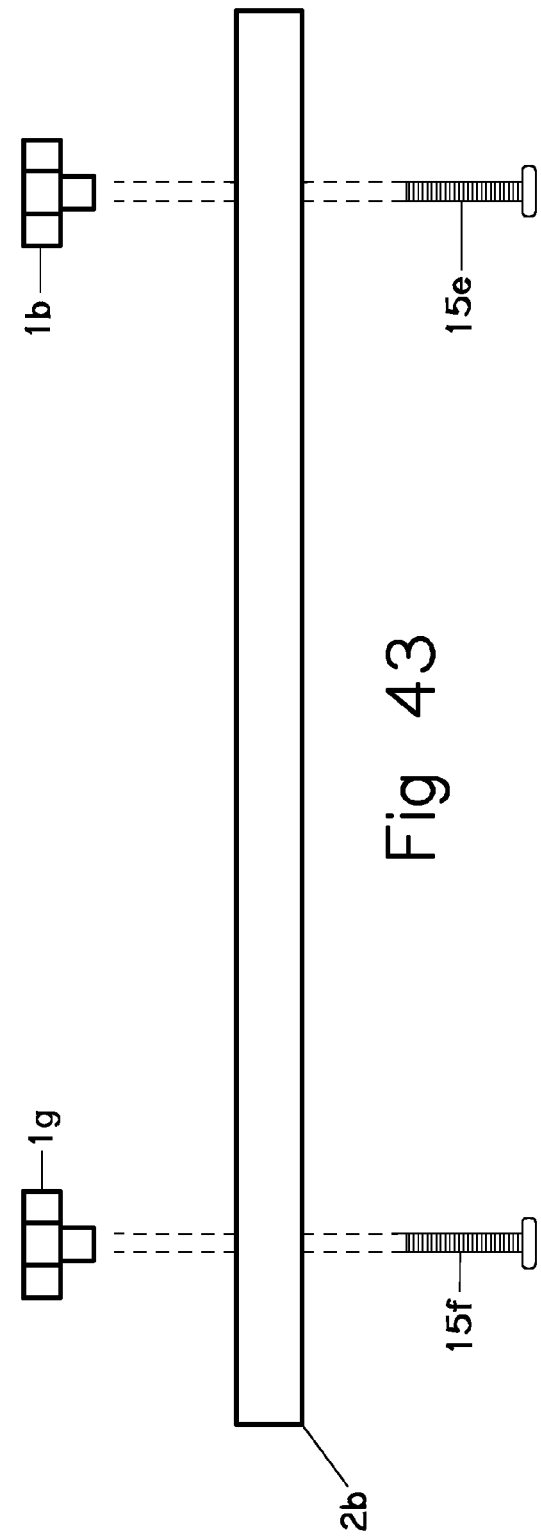

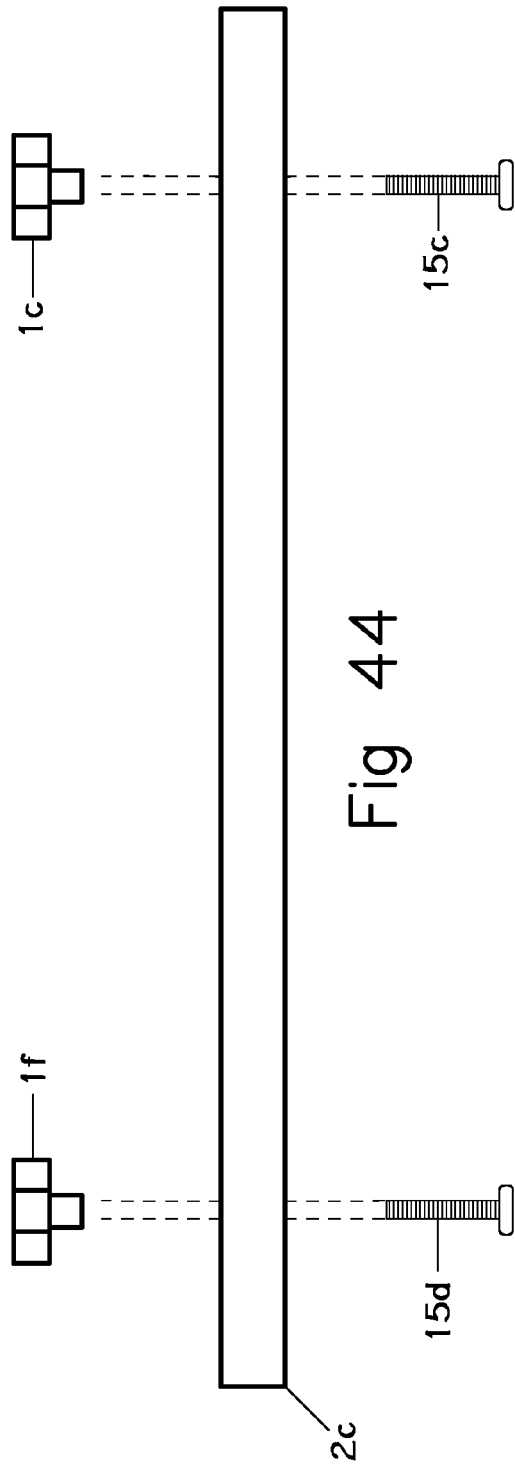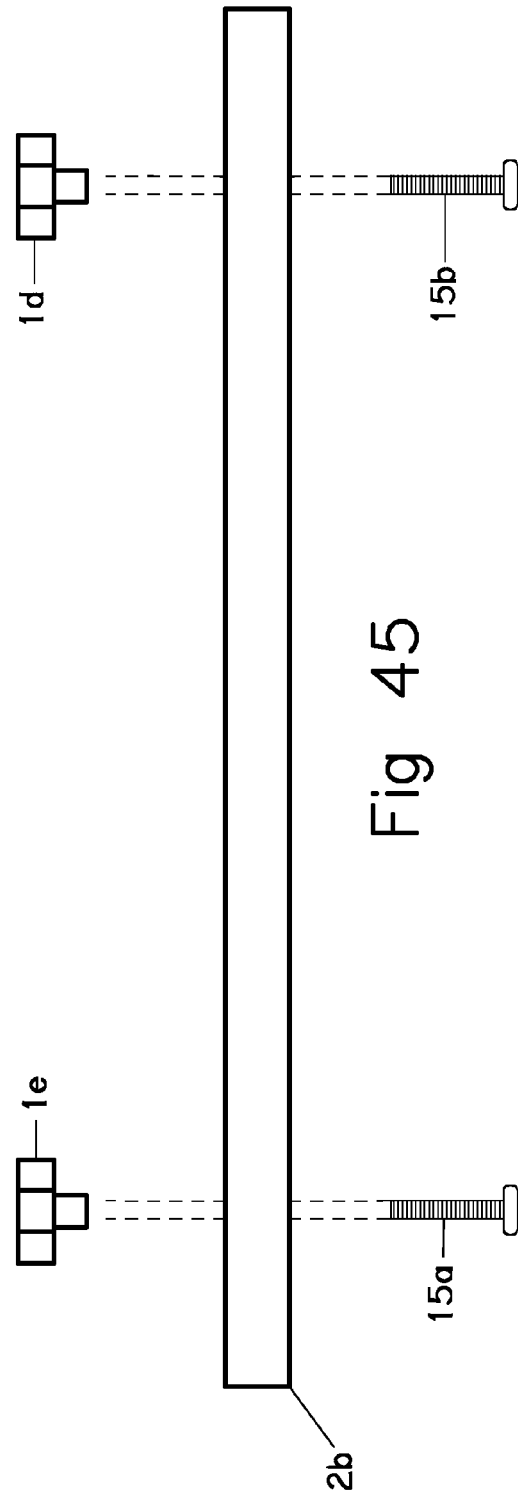

DADOING SYSTEM

CROSS-REFERENCE TO RELATED APPLICATIONS

"Not Applicable"

STATEMENT REGARDING FEDERALLY SPONSORED RESEARCH OR DEVELOPMENT

"Not Applicable"

BACKGROUND OF THE INVENTION

1. Field of Invention

The present invention relates generally to the field of woodworking, more specifically to cabinet and furniture making, and relates to a system for holding a workpiece in place with sliding guide rails that are tightened down in strategic places so that a hand held power tool can perform the needed task.

2. Prior Art

Prior art teaches that the router is the best solution for cutting clean dados and grooves. The reason for using a router over other tools such as a table saw would be that a router bit is cutting across the grain while the table saw blade is rotating downward. This downward rotation will pull the veneer down and away from the substrate that the veneer is glued to. This pulling down and away from the substrate causes the veneer to break off and leave the substrate underneath the veneer exposed, thus leaving an undesirable result on the workpiece.

(A) Other prior arts have attempted to make dadoing easier and a more efficient operation. One such prior art would be U.S. Pat. No. 5,682,934 patented on Nov. 4, 1997—Class 144/Sub-Class 144.51 to Richard C. Rybski, which teaches a system that has a base, which a router or other power tools can ride between two angle irons. While this will give a clean dado and a straight cut, the operator will have to stop and reset the system for each dado or cut made. Also the cutouts for the hold-downs are placed so that the operator must position the workpiece in a fashion where the workpiece can be held down without the hold-downs being in the way of the router or tool being used. Another problem with this system is there is no place for calibrated measurement means to help in the setup of the workpiece in relation to the tool guide. This will make it very hard and time consuming to make accurate repetitive cuts or dados.

(B) Another prior art would be patent No. 4,966,507 patented on Oct. 30, 1990—Class 409/Sub-Class 175 to Robert Hanks. One problem with this router jig is that the clamping mechanism comprising of two boards that hold the workpiece in place are adjustable and therefore will need careful attention during the setup process to make sure that the workpiece is square to the base plate portion of the jig. Another problem with the jig is the horizontal and vertical guides. Even though the guides are adjustable with a suitable calibrated measurement means on them, it will still be difficult to insure that the guides are square to the workpiece. The reason for this is that both the vertical and horizontal guides will have some play in them since they are adjustable. This play on the guides can cause the calibrated measurement means to be off, making it possible for the dados to be out of square on the workpiece.

(C) U.S. Pat. No. 3,770,031 patented on Nov. 6, 1973—Class 144/Sub-Class 136 R to Eugene T. Olson for a routing fixture. This fixture will have to have repeated setups for each dado that is cut into the workpiece. This is time consuming and it will be very difficult to align the workpiece and the bit that is in the router to the precise area that is marked for the dado on the workpiece. It also would be very hard to cut perfectly matching dados in a workpiece.

(D) U.S. Pat. No. 4,215,731 patented on Aug. 5, 1978—Class 144/Sub-Class 136 C to Douglas E. Maynard for a router guide assembly. One problem with this router guide is that the workpiece must be moved after each dado is made. Then the workpiece must be moved to line up with the notch in the fence so that the bit is not damaged as the bit exits the workpiece. Another problem is setting up the depth of the router bit. The operator of the router must allow for the extra distance between the router carriage and the workpiece. There also is a problem as far as lining the workpiece up with the with the router bit because there are no calibrated measurement means to help line the workpiece up with the router bit.

(E) U.S. Pat. No. 5,533,556 patented Jul. 9, 1996—Class 144/Sub-Class 144.52 to David Whitney for a router guide apparatus. While this apparatus is portable, you must clamp the guide on each workpiece that needs a dado cut into it. This means that the apparatus must be clamped on each workpiece multiple times and great care must be given to the placement of the guide on each workpiece so that the matching dados will line up properly. This is quite time consuming and would be very hard to use in a production type setting.

While all of these dadoing jigs do have a limited ability for making straight dados or grooves, these jigs require a new setup for each dado that is required on a workpiece. Also with these jigs, it is quite difficult to be sure that the workpiece is positioned in the exact same place as the previous workpiece. If the workpiece is not set up the same as the previous workpiece this could result in the dados not lining up properly when the workpieces are assembled. This shows that there is a need for a system that can make one or more repeatable dados on a workpiece and that does not take much time or effort to set up.

BRIEF SUMMERY OF INVENTION

In view of the disadvantages of the prior art of dadoing jigs, the present dadoing system provides a means to make multiple dados in a transverse direction on a workpiece. The general purpose of this invention, which will be described subsequently in greater detail, is a system that will hold a workpiece in place and allow the setup of one or more guides to produce fast and reliable dados. This system allows the operator to dado one workpiece at a time or two workpieces can be dadoed at the same time, which insures that the dados on each workpiece will line up properly.

To attain this the present system uses rigid sliding guide rails that can be secured in place on a rigid track system that has calibrated measurement means. The workpiece is held in place with the sliding channel clamp and by the sliding guide rails. The sliding channel clamp keeps the workpiece from moving in a transverse direction while the sliding guide rails apply a downward pressure on the workpiece. To insure the repeatability of each dado, there are sliding guide rail stops that are placed at each end on the backside of each sliding guide rail. Once all of the dados have been cut into the workpiece, the workpiece can be removed by simply loosening one end of each sliding guide rail and sliding the workpiece out of the dadoing system.

BRIEF SUMMARY OF THE INVENTION—OBJECTS AND ADVANTAGES

The objects and advantages of the present invention are:

(a) to provide a dado system that can be set up to make multiple dados on a workpiece.
(b) to provide a dado system that is easy to set up and use.
(c) to provide a dado system that is accurate.
(d) to provide a dado system that is cost efficient to manufacture.
(e) to provide a dado system that has a wide target market.
(f) to provide a dado system that can be used in a production type environment.
(g) to provide a dado system the home craftsman can use easily and efficiently.
(h) to provide a dado system that has a calibrated measurement means which can be used to easily and accurately align the sliding guide rails.
(i) to provide a dado system that has sliding guide rail stops, which allows for easy repeat dados.
(j) to provide a dado system that can produce thru dados as well as stop dados.
(k) to provide a dado system that holds a workpiece in place with a sliding channel clamp and downward pressure from the sliding guide rails.

Further objects and advantages are to provide a dado system that can accommodate two workpieces so that both workpieces can have the dados cut at the same time, thus saving setup time while insuring that the dados for both workpieces will line up properly. Still further objects and advantages are there is no special training necessary to get accurate results from the dado system.

The objects and advantages of this invention along with various features of novelty, which characterize the invention and helped form part of this disclosure, will be further pointed out in the claims portion of the specifications. For a better understanding of the invention, its operating advantages and the specific objects attained by its uses, reference should be made to the accompanying drawings and descriptive matter, which will be illustrated further in the preferred embodiment of the invention.

BRIEF DESCRIPTION OF THE SEVERAL VIEWS OF THE DRAWING

In the drawings, closely related figures have the same number but different alphabetic suffixes.

FIG. 2 is a perspective view of the base of the dadoing system 11.

FIG. 3 is a front view of the front edge 11c of the base.

FIG. 4 is a perspective view of the base shown as the squaring rails 13a thru 13c of the system have been installed.

FIG. 5 shows the front view of the front edge of the base 11c after squaring rail 13c has been installed on the upper surface of the base 11a.

FIG. 7 shows the front view of the front edge 11c with squaring rail 13c installed on the upper surface of the base 11a.

FIG. 37 shows front view of cross section of FIG. 10.

FIG. 38 shows top view of the sliding channel clamp 5.

FIG. 39 shows cross section of base 11 showing how the sliding channel clamp 5 can be adjusted and secured to the base of the dadoing system.

FIG. 40 shows end view of sliding channel clamp 5.

FIG. 41 shows perspective view of track 3e and the sliding guide rail 2b that the sliding fliparm router stop 66 is slidably engaged to.

FIG. 42 thru 45 shows side view of the sliding guide rails with the male-threaded fasteners 15a thru 15h and the female threaded receivers 1a thru 1h ready to be engaged to tracks 4a and 4b.

DETAILED DESCRIPTION OF THE INVENTION

Figure 1:
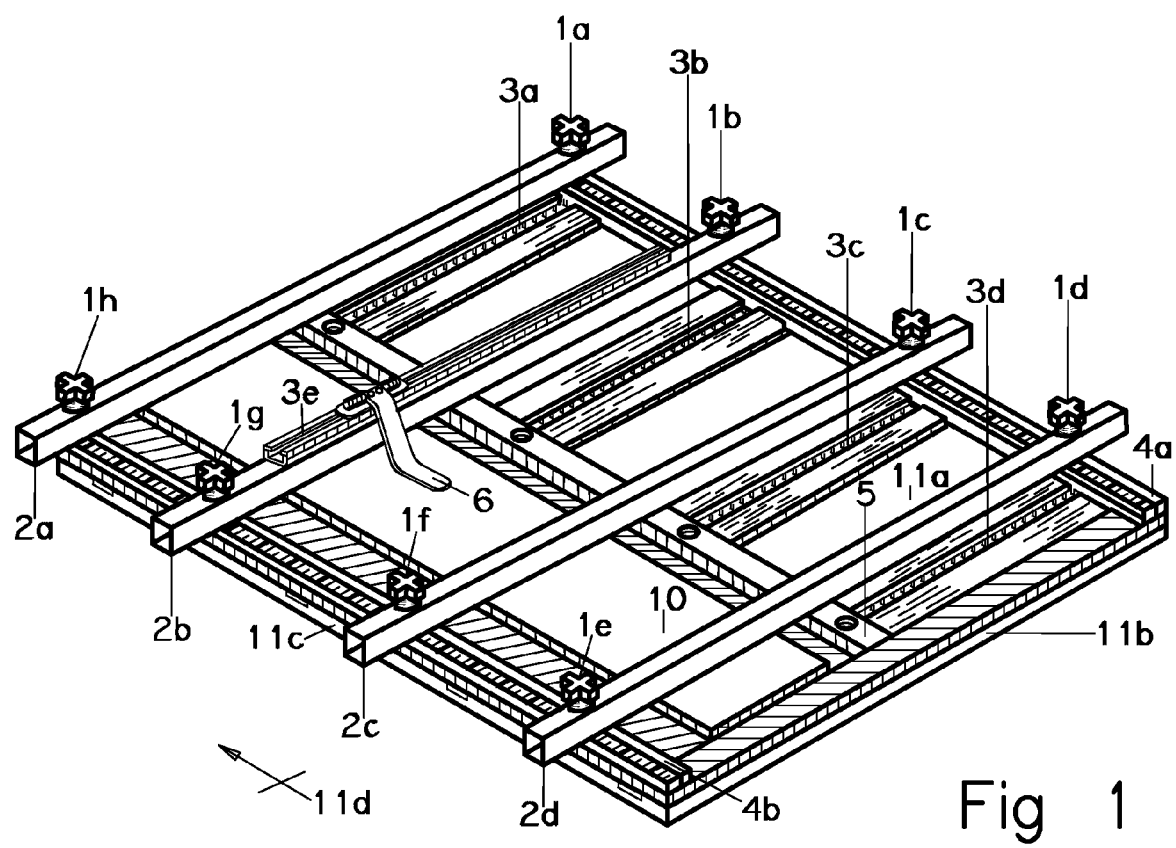
FIG. 1 is a perspective view of the complete dadoing system.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Referring to the drawings in detail, closely related figures have the same number but different alphabetic suffixes.

FIG. 1 shows the dadoing system in a perspective view, set up with a workpiece in place ready to be dadoed. The dadoing system comprises: a base (which includes four edges and a upper surface and a lower surface) hereafter will be referred to as reference number 11; consists of upper surface 11a, right edge 11b, front edge 11c and left edge 11d; (the back edge and lower surface of the system are not shown); a plurality of tracks having a calibrated measurement means; a plurality of sliding channel clamp tracks; a plurality of sliding guide rails; at least one sliding channel clamp; at least one fliparm router stop; a plurality of squaring rails; a plurality of risers and at least one fliparm router stop track. The base 11 comprises a planar, rigid, and substantially rectangular surface, which is oriented substantially horizontally in operation.

The preferred measurements of the base of the dadoing system are approximately 48" long and 40" wide. The upper surface of the base 11a receives dados for tracks 3a thru 3d that are constructed preferably from a rigid metal material, that can accept a male-threaded fastener, preferably a t-bolt, which will allow the sliding channel clamp 5 to slide in a transverse direction. This transverse movement will allow workpieces of different widths to be secured in place on the dadoing system. The dados 12a thru 12d on the upper surface of the base 11a should be spaced so that the sliding channel clamp 5 will be properly supported in its longitudinal direction on the upper surface 11a of the base. The dados 12a thru 12d are cut into the upper surface of the base 11a. The dados have a predetermined width and depth that receives and stabilizes the sliding channel clamp tracks 3a thru 3d. The base 11 should look similar to FIG. 2 and FIG. 3.

The squaring rails will be fastened on the upper surface of the base 11a. The squaring rails keep the workpiece square on the dadoing system. The squaring rails 13a thru 13c are preferably constructed from a substantially straight, flat, rigid material. Squaring rail 13a is wide enough to accommodate sliding guide rail track 4a. When fastened to the upper surface of the base 11a, one end of the squaring rail 13b should align with the front edge of the base 11c and one side of the squaring rail 13b should align with the right edge of the base 11b. Squaring rail 13b is preferably the same width as squaring rail 13a. One end of the squaring rail 13a should be in contact with one long edge of squaring rail 13b and the other end should align with left edge of the base 11d. One long side of squaring rail 13a should align with the back edge of the base 11 (back edge of base not shown). One end of the squaring rail 13c should also be in contact with one long edge of squaring rail 13b and the other end should align with the left edge of the base 11d. The width of squaring rail 13c is wide enough to accommodate sliding guide rail track 4b and to have enough space to allow router bit 30 to start turning before the bit makes contact with the workpiece 10. The base of the dadoing system should look similar to FIG. 4.

Figure 6:
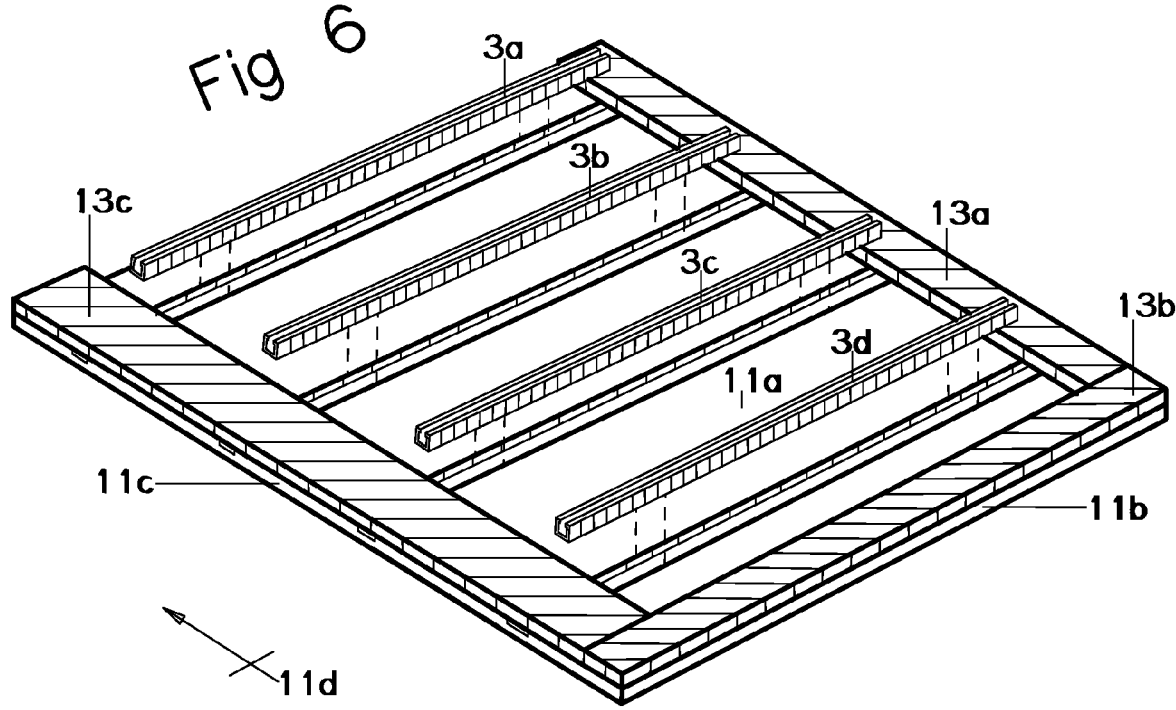
FIG. 6 shows a perspective view of the base depicting the placement of the tracks 3a thru 3d for the dadoing system.
Figure 7:
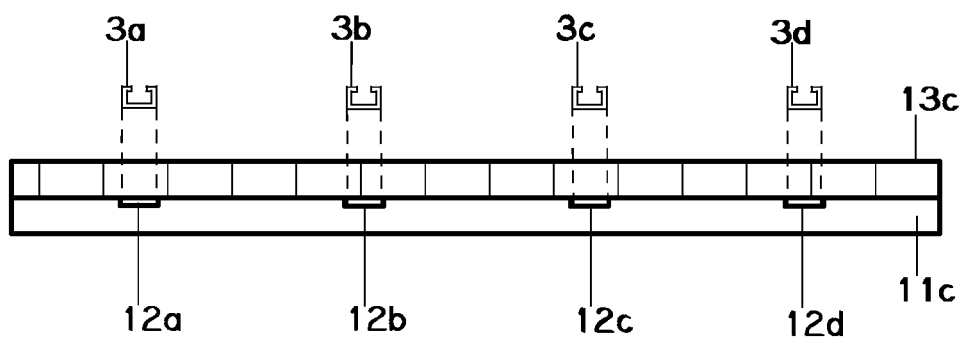
Figure 8:
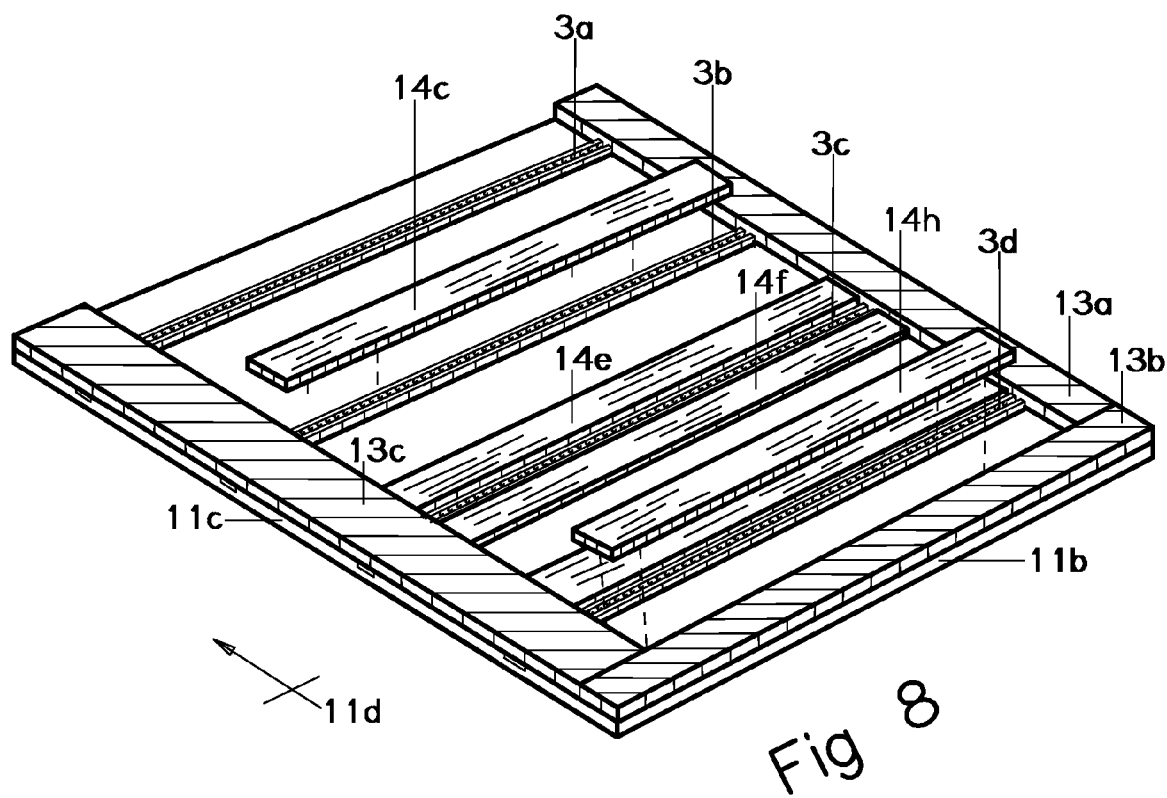
FIG. 8 shows a perspective view of the base, depicting placement of the risers 14a thru 14h.
Figure 9:
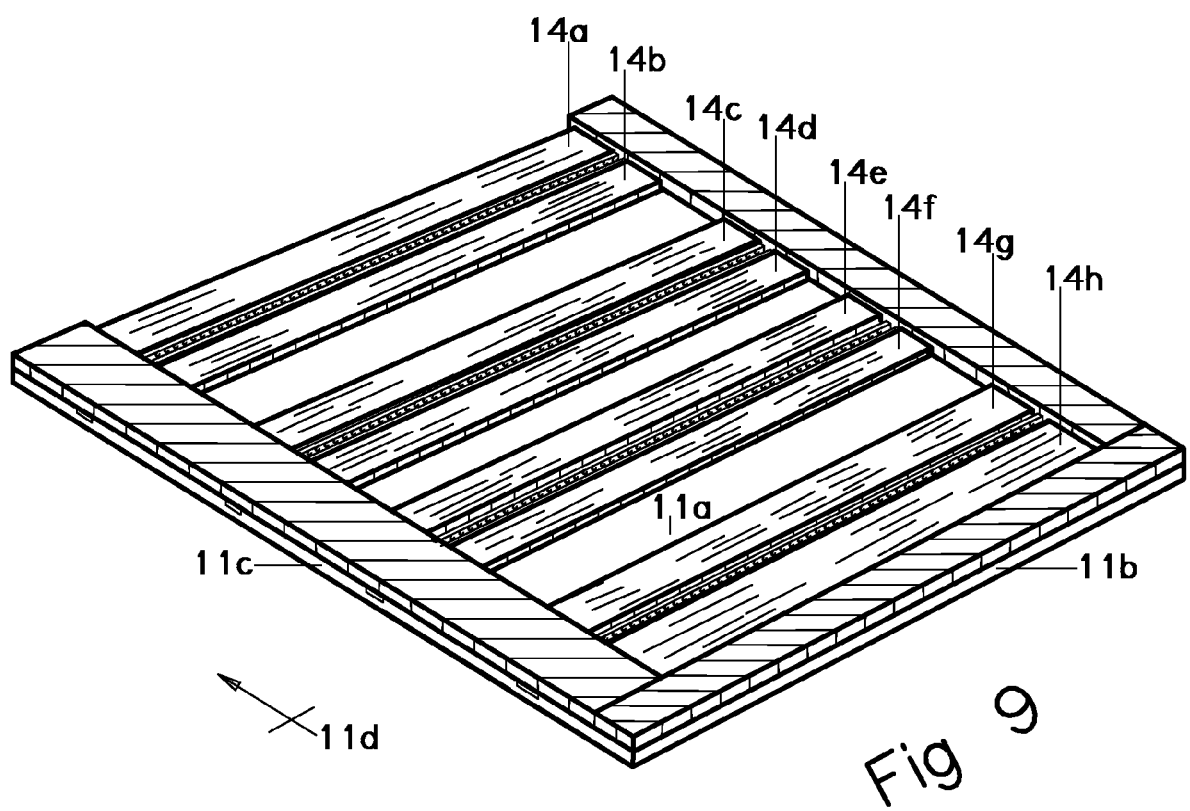
FIG. 9 shows a perspective view of the base of the system after the risers 14a thru 14h and tracks 3a thru 3d have been installed.
Figure 10:
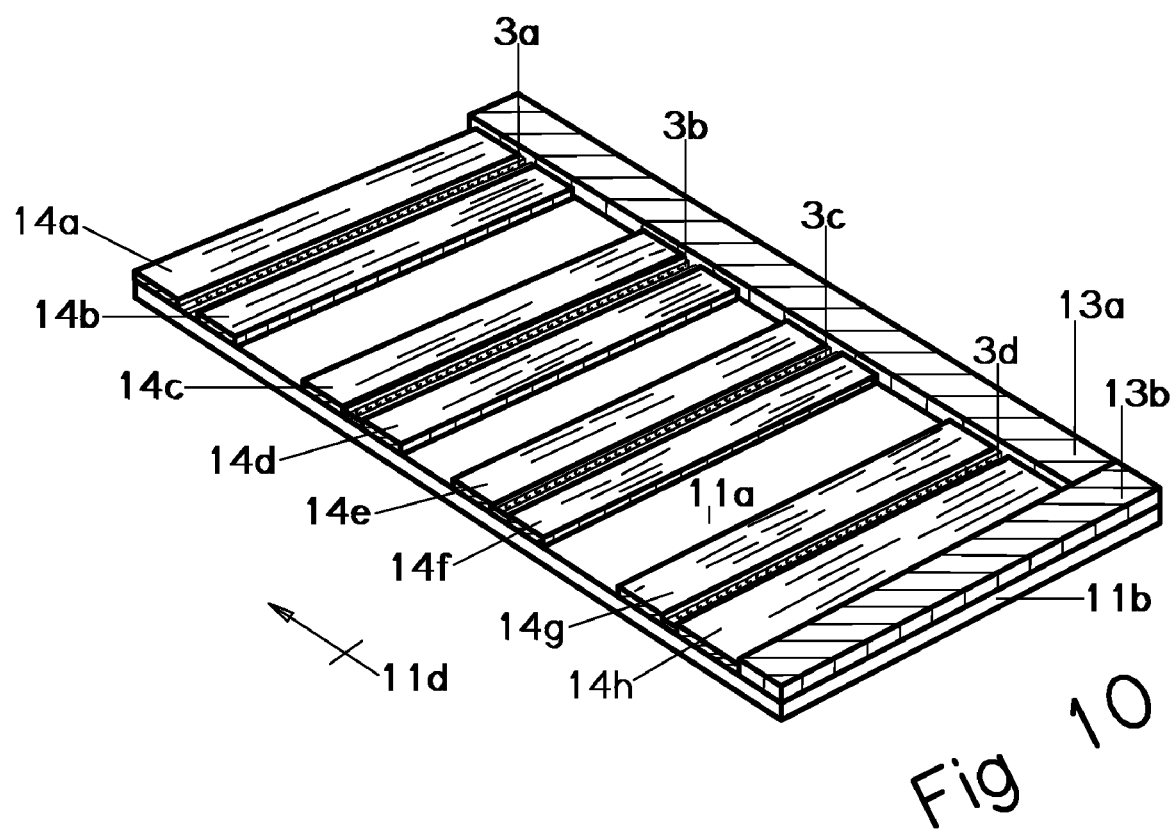
FIG. 10 shows a cross section of the base in a perspective view at the same stage of construction as FIG. 9.
Figure 11:
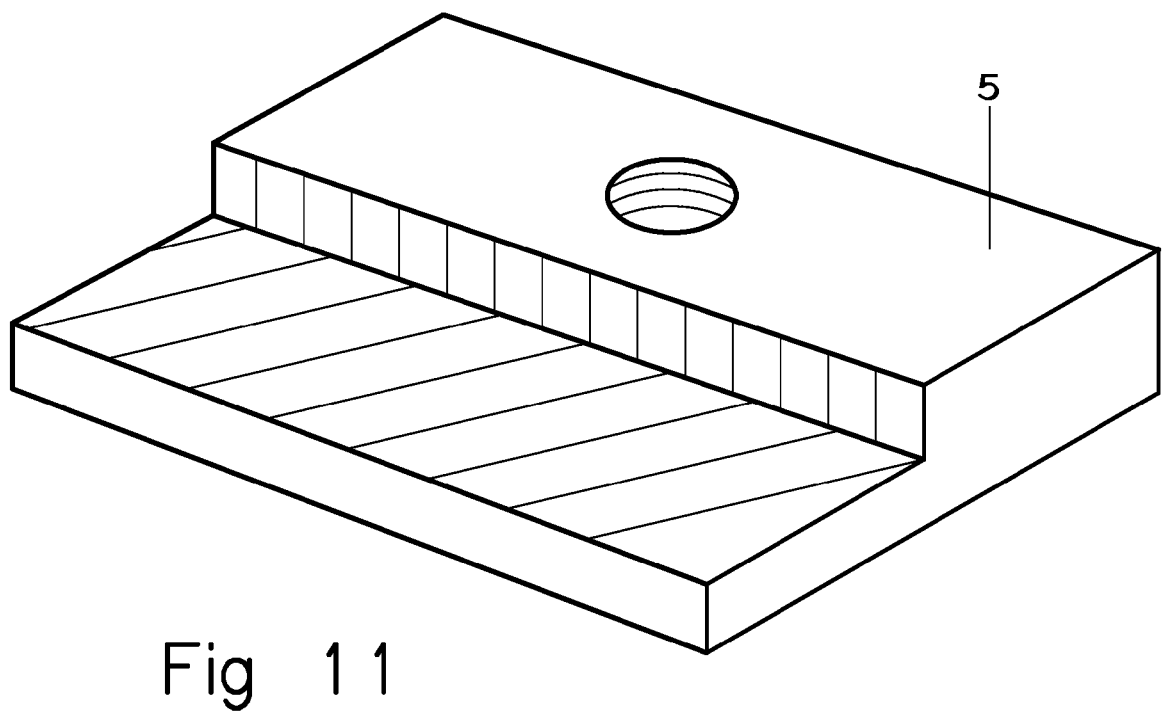
FIG. 11 shows a perspective view of a small section of sliding channel clamp 5 that helps hold the workpiece 10 in place.
Figure 12:
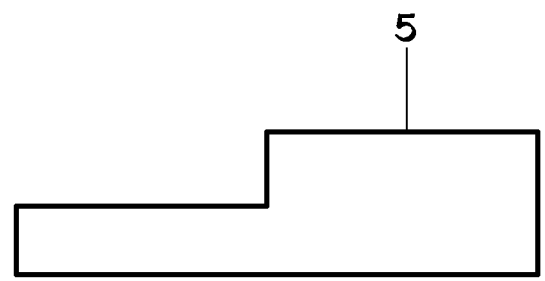
FIG. 12 shows an end view of the sliding channel clamp 5.
Figure 13:
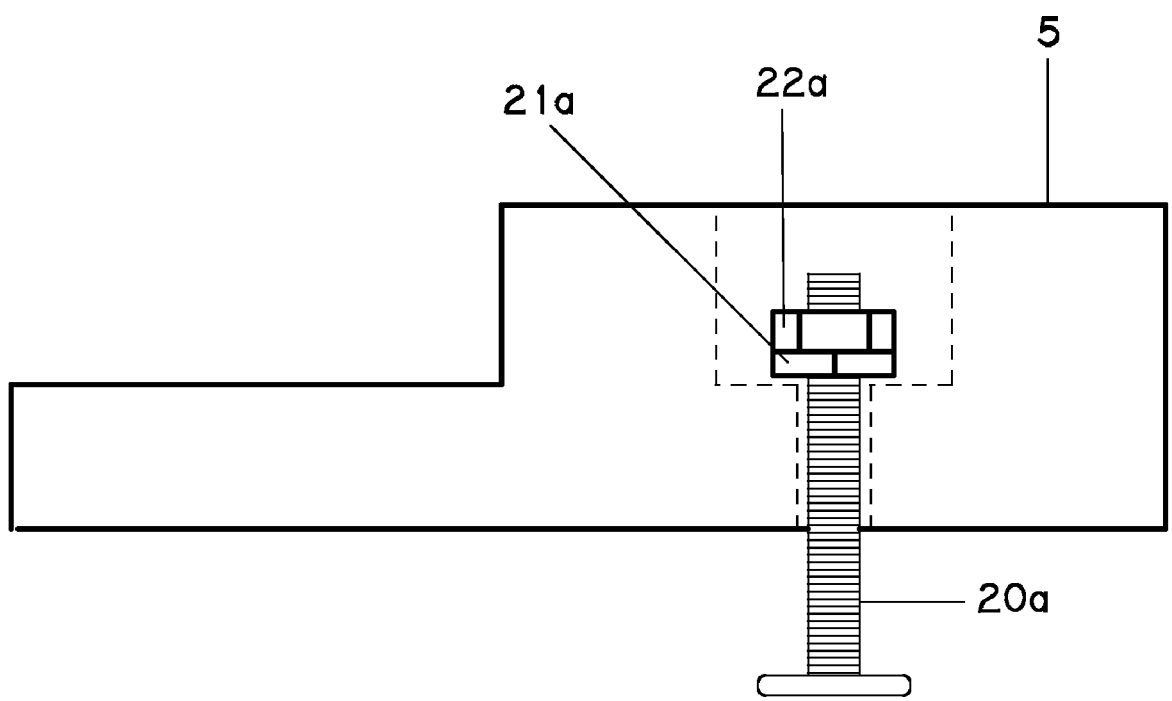
FIG. 13 shows the end view of the sliding channel clamp 5, which shows how the sliding channel clamp 5 is secured in place on the base of the dadoing system.
Figure 14:
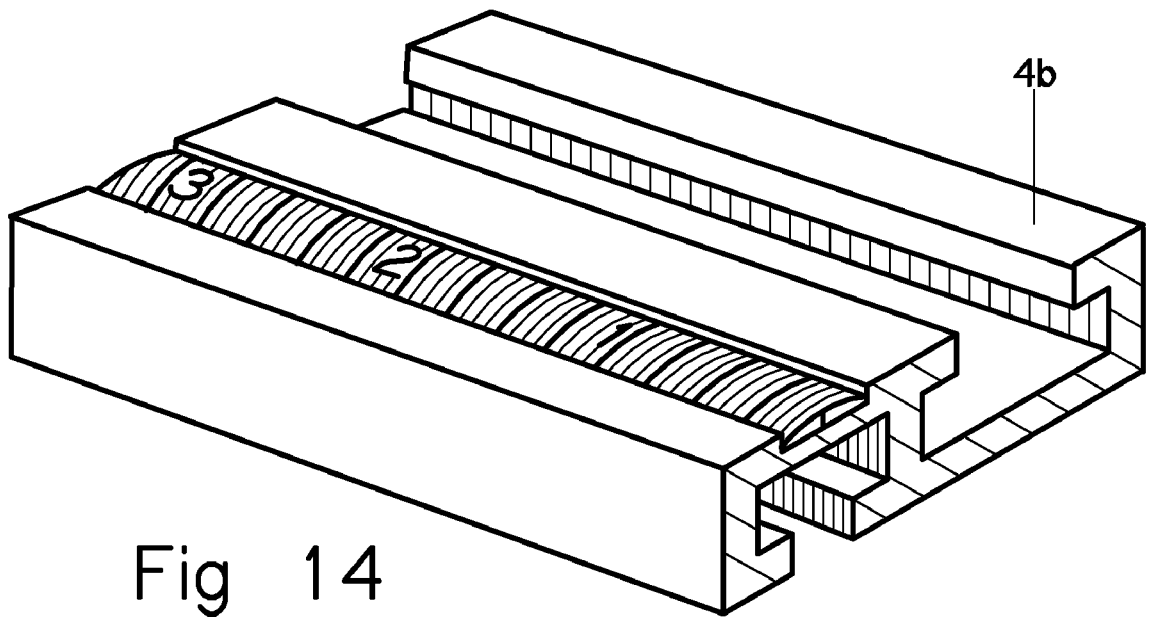
FIG. 14 shows in perspective view a small piece of track 4b that has calibrated measurements means that help align the sliding guide rails when setting up the dadoing system.
Figure 15:
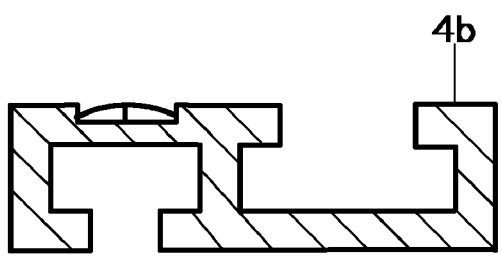
FIG. 15 shows the end view of the same small piece of track 4b in FIG. 14.
Figure 16:
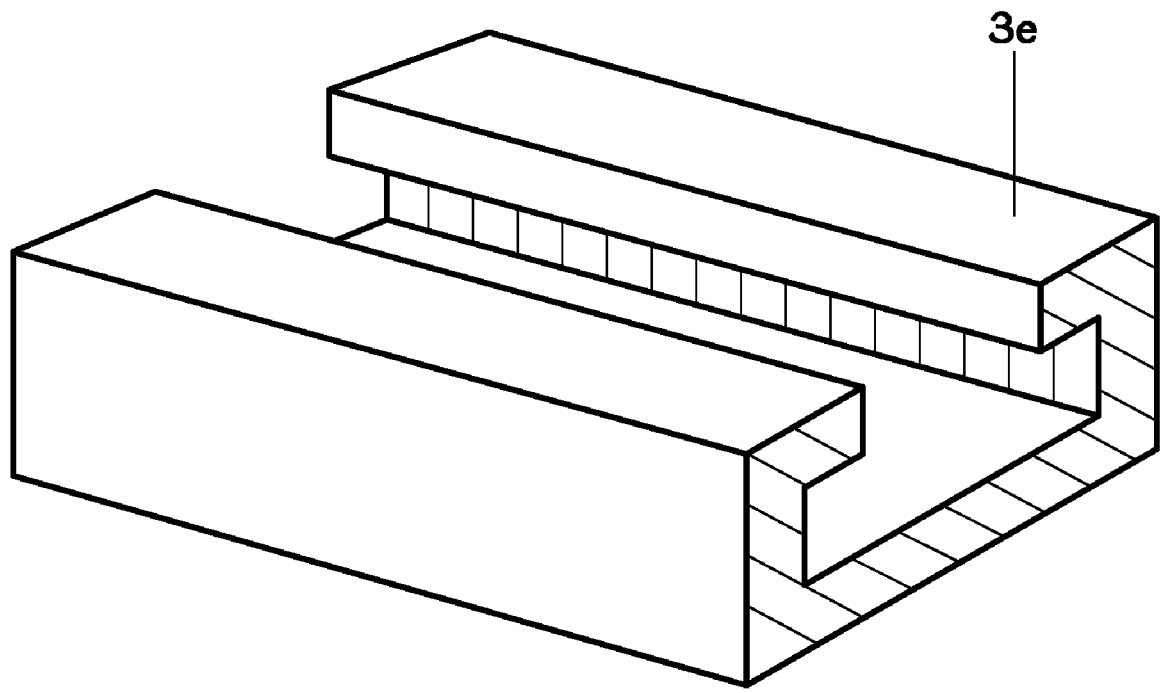
FIG. 16 shows a perspective view of the single track 3e that allows the sliding fliparm router stop to slide in a transverse direction, which allows the operator to make stop dados on the workpiece 10.
Figure 17:
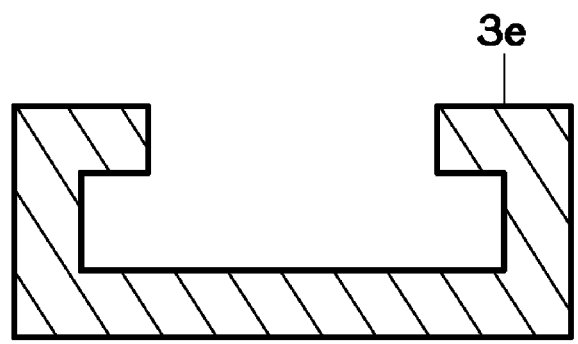
FIG. 17 shows the end view of track 3e in FIG. 16.
Figure 18:
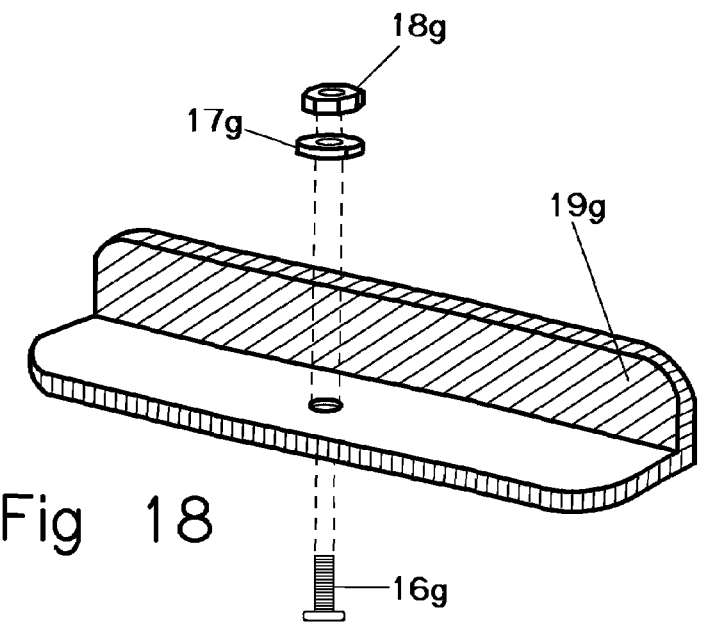
FIG. 18 shows a perspective view of a sliding guide rail stop 19g.

Tracks 3a thru 3d are fastened on the upper surface of the base 11a. Tracks 3a thru 3d fit between squaring rails 13a and 13c and are fastened in each dado 12a thru 12d that were previously cut into the upper surface of the base 11a. This insures that the tracks 3a thru 3d are square with the squaring rails and the rest of the base 11 and also stabilizes the tracks 3a thru 3d. In FIG. 6 the details of the drawing show the tracks 3a thru 3d are ready to be fastened to the upper surface of the base 11a. The tracks 3a thru 3d will allow for the transverse movement of the sliding channel clamp 5.

The riser's 14a thru 14h can be fastened to the top of the base 11a on each side of the tracks 3a thru 3d. The risers are preferably constructed from substantially flat, elongated, rigid material. The risers fit between squaring rails 13a and 13c. The risers are preferably ¼" higher than tracks 3a thru 3d. The purpose of the risers are to raise the workpiece 10 and the sliding channel clamp 5 above the tracks, allowing the workpiece 10 to be taken in and out of the system and allowing the sliding channel clamp 5 to move in a transverse direction without coming into contact with the tracks 3a thru 3d or any debris or wood chips from the dadoing process.

The tracks 4a and 4b preferably constructed of rigid metal material that can accommodate male-threaded fasteners, preferably t-bolts, and having the calibrated measurement means are now fastened to the dadoing system. The tracks 4a and 4b are approximately the length of the base 11. The first track 4b should be installed on squaring rail 13c. Each end of the track 4b aligns with each edge of the system 11b and 11d. The side of the track 4b aligns with the front edge of the base 11c. The second track 4a should be fastened to the system in the same manner as the first track 4b.

Sliding channel clamp 5 is preferably constructed from a rigid substantially straight material having a predetermined width, length and thickness. The sliding channel clamp has male-threaded fasteners, preferably t-bolts 20a thru 20d, which are slidably engaged with tracks 3a thru 3d. Each male-threaded fastener extends from one of the tracks 3a thru 3d and is received by holes that are countersunk into the sliding channel clamp 5 that are aligned with tracks 3a thru 3d. The male-threaded fasteners have female-threaded receivers, preferably nuts 22a thru 22d, which are accompanied by a means, preferably lock washers 21a thru 21d, to hold the female-threaded receivers in place when the female-threaded receivers are receiving and securing the male-threaded fasteners that secure the sliding channel clamp 5 down in place during use. The reason for the countersunk holes are that the top area of the sliding channel clamp 5 must be clear of any obstructions because the sliding guide rails 2a thru 2d slide over the top of the sliding channel clamp 5. Sliding channel clamp 5 also has a channel cut into it that allows the router bit 30 to exit the workpiece 10 without cutting into the sliding channel clamp 5. In FIG. 38, FIG. 39, FIG. 40, and FIG. 51 it can be seen how these parts are used to make the sliding channel clamp 5 adjustable for accepting different widths of workpieces that may be used in the dadoing system.

Figure 28:
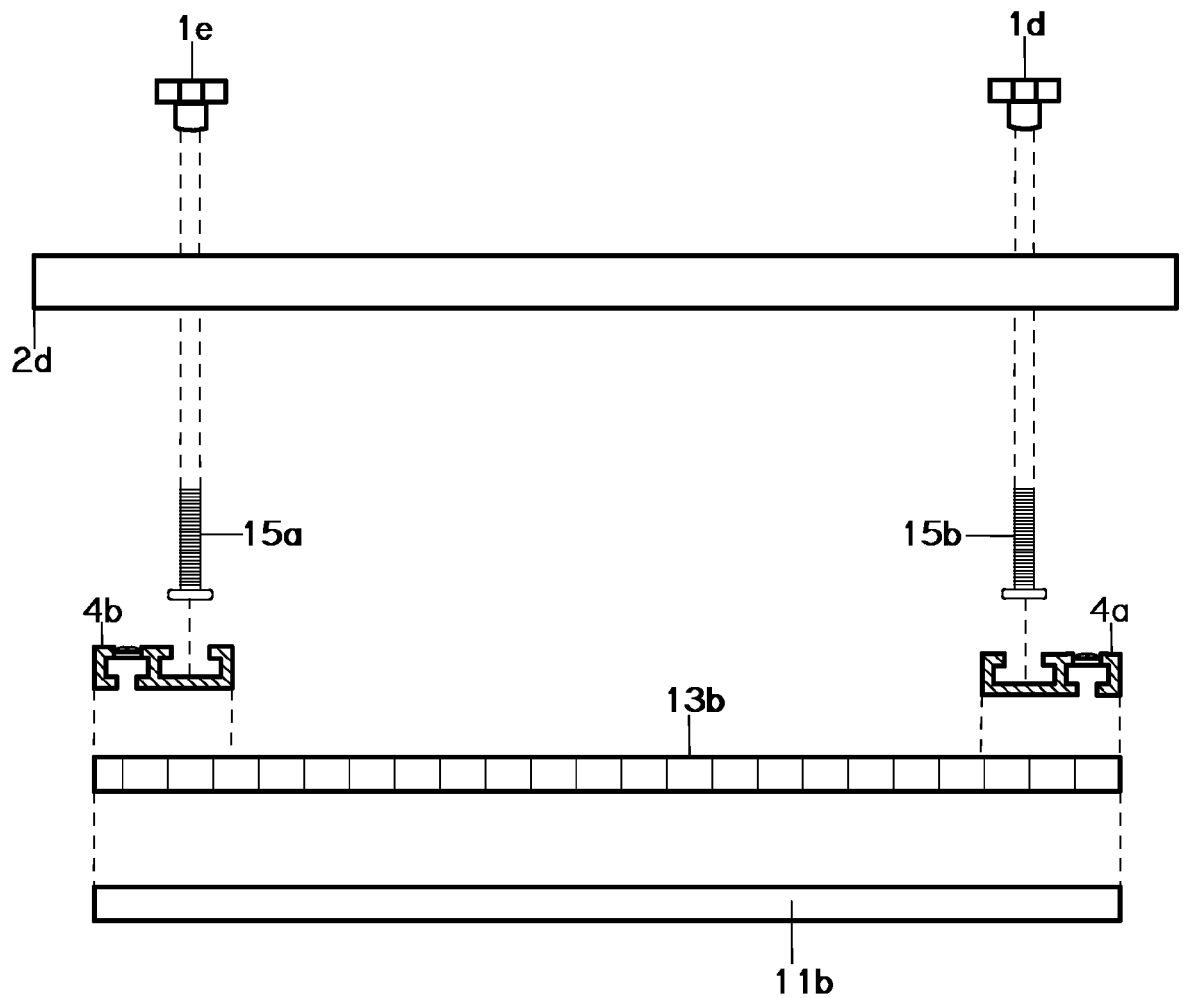
FIG. 28 shows a exploded view of the right end of the dadoing system.
Figure 29:
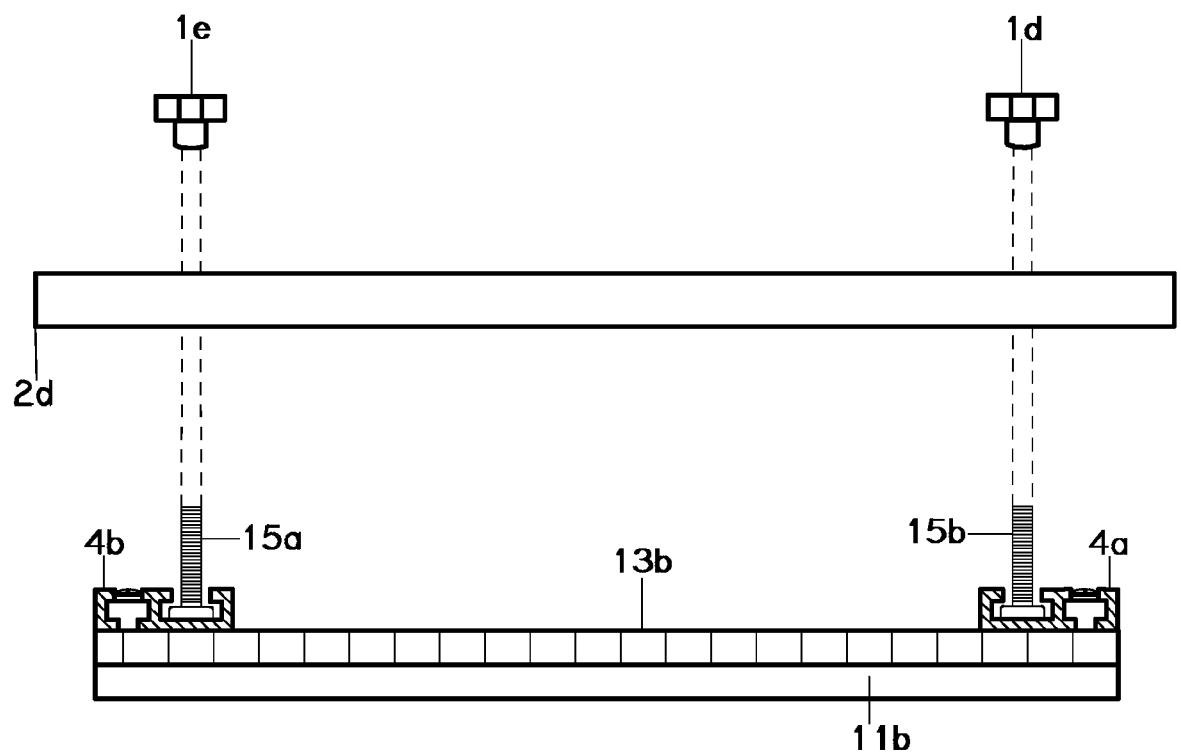
FIG. 29 shows the end view of the right end of the system as the sliding guide rail 2d is being put into place.

The sliding guide rails 2a thru 2d are preferably constructed from substantially square, straight, rigid metal material; being sildably engaged with tracks 4a and 4b, while spanning the area that can receive the workpiece 10. Each end of the sliding guide rails overhang tracks 4a and 4b as shown on FIG. 46. A hole is drilled on each end of each sliding guide rail 2a thru 2d so that a male-threaded fastener, preferably t-bolts 15a thru 15h, can extend thru each end of each sliding guide rails 2a thru 2d and each male-threaded fastener being engaged with one of the tracks 4a or 4b, which can be seen in FIG. 28 and FIG. 29. This will allow longitudinal movement for each sliding guide rail, which will allow set up anywhere along the length of the workpiece 10. Female-threaded receivers, preferably knobs, are shown in FIG. 1. The knobs 1a thru 1h are preferably made from rigid material that will accept a male-threaded fastener, preferably a t-bolt, used to lock down each end of each sliding guide rail 2a thru 2d. Female-threaded receivers or knobs 1a thru 1h should be small enough that they do not extend past the sides of the sliding guide rails 2a thru 2d, thus leaving a clear path for the router 31. Sliding guide rail stops 19a thru 19f are used to be a positive stop for the sliding guide rails 2a thru 2d.

Figure 19:
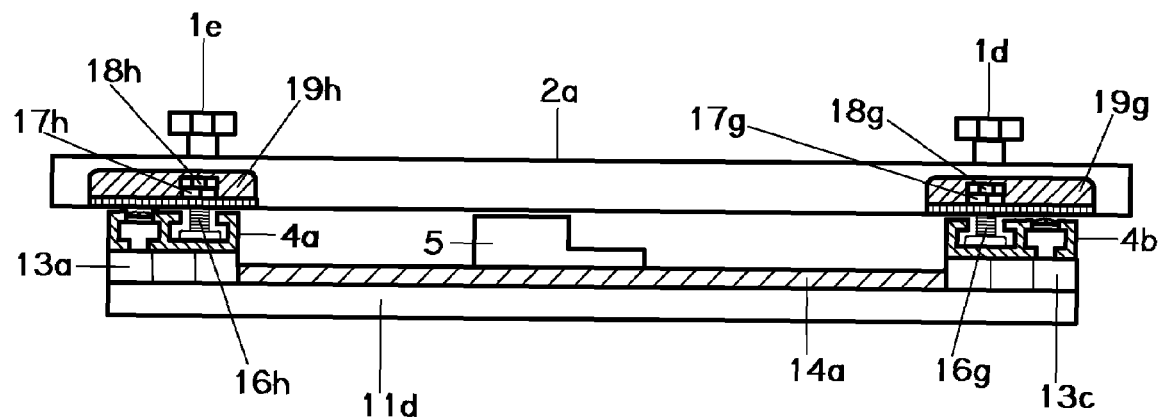
FIG. 19 shows the end view of the open end of the dadoing system.
Figure 20:
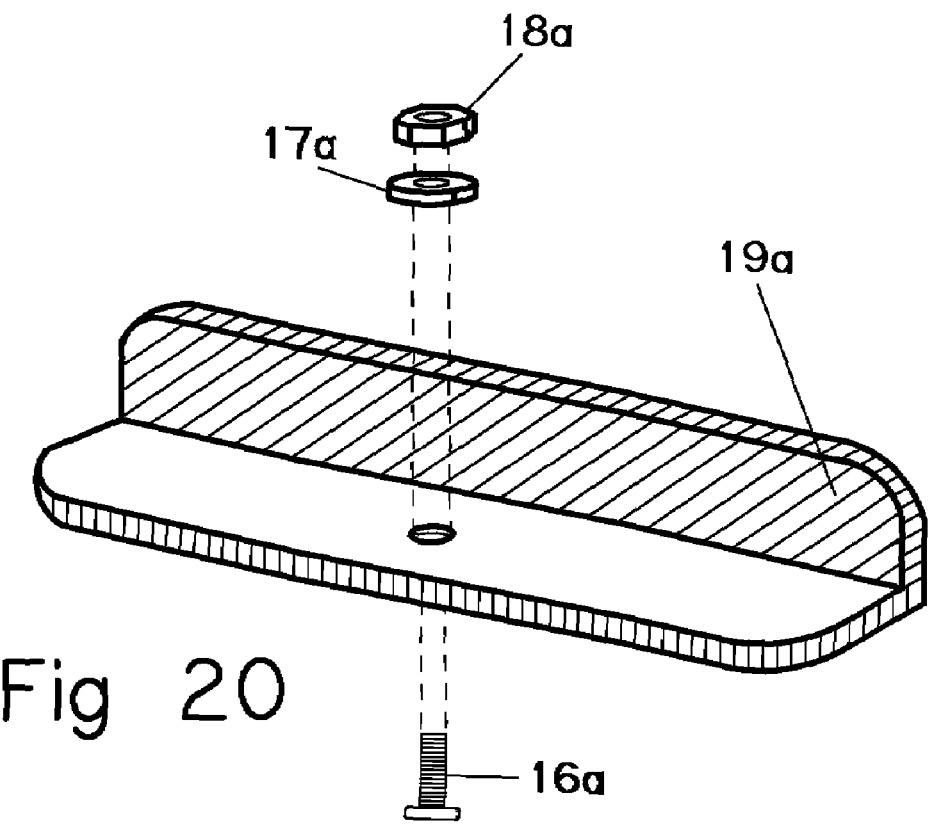
FIG. 20 thru 27 shows a perspective view of the guide rail stops for the dadoing system.
Figure 21:
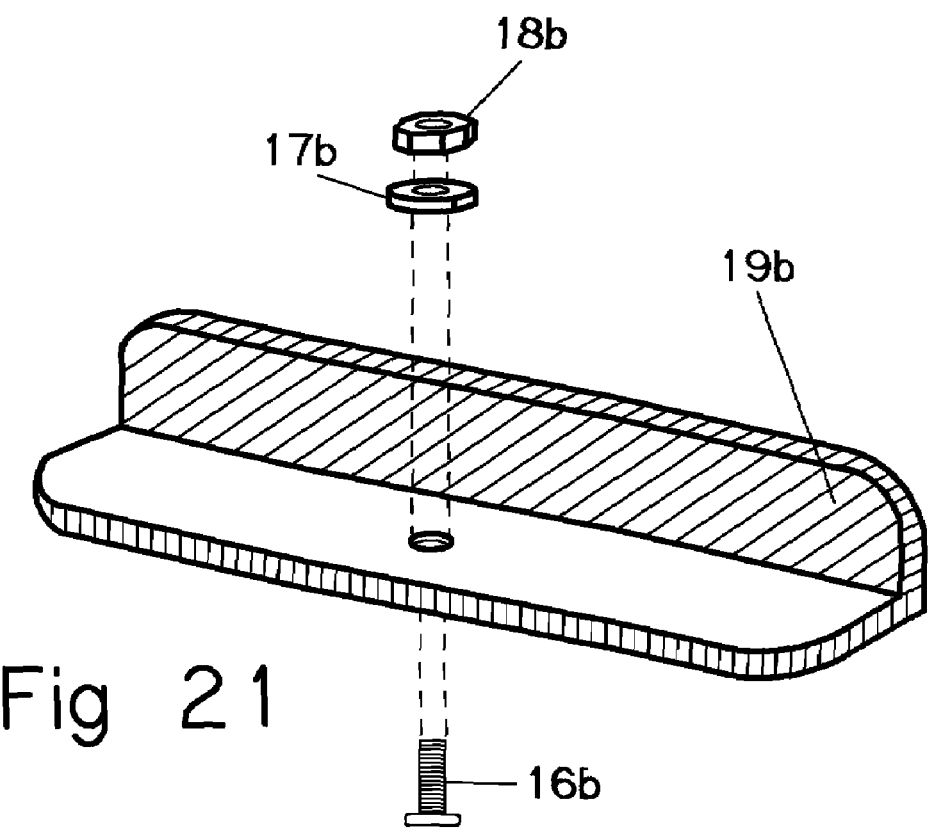
Figure 22:
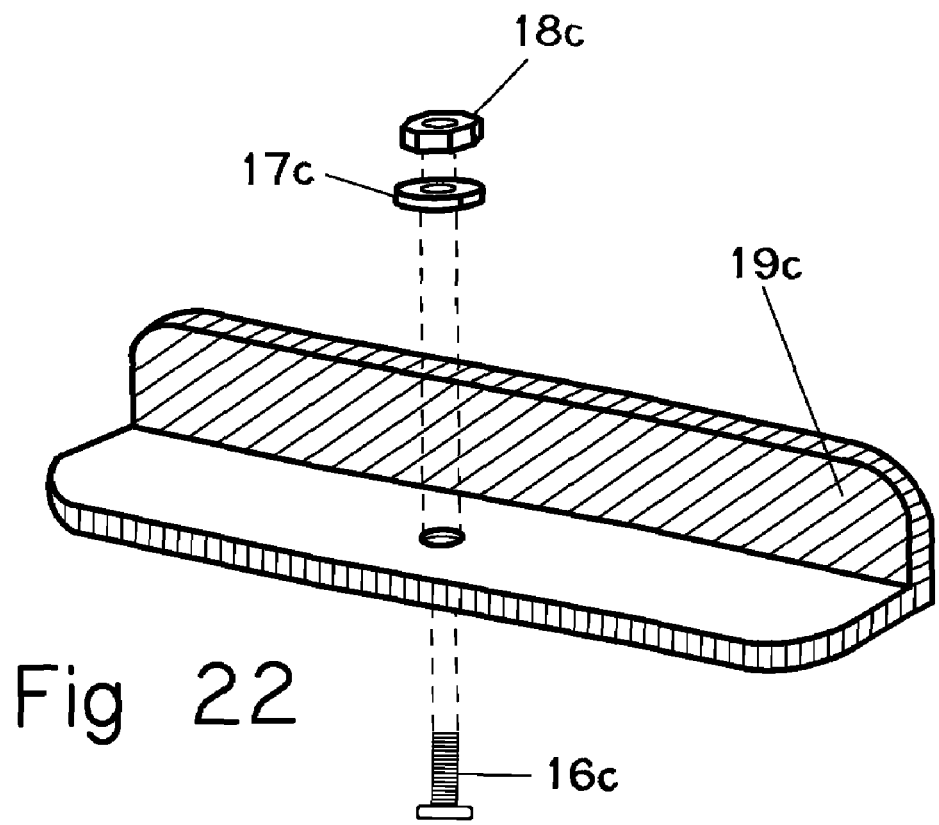
Figure 23:
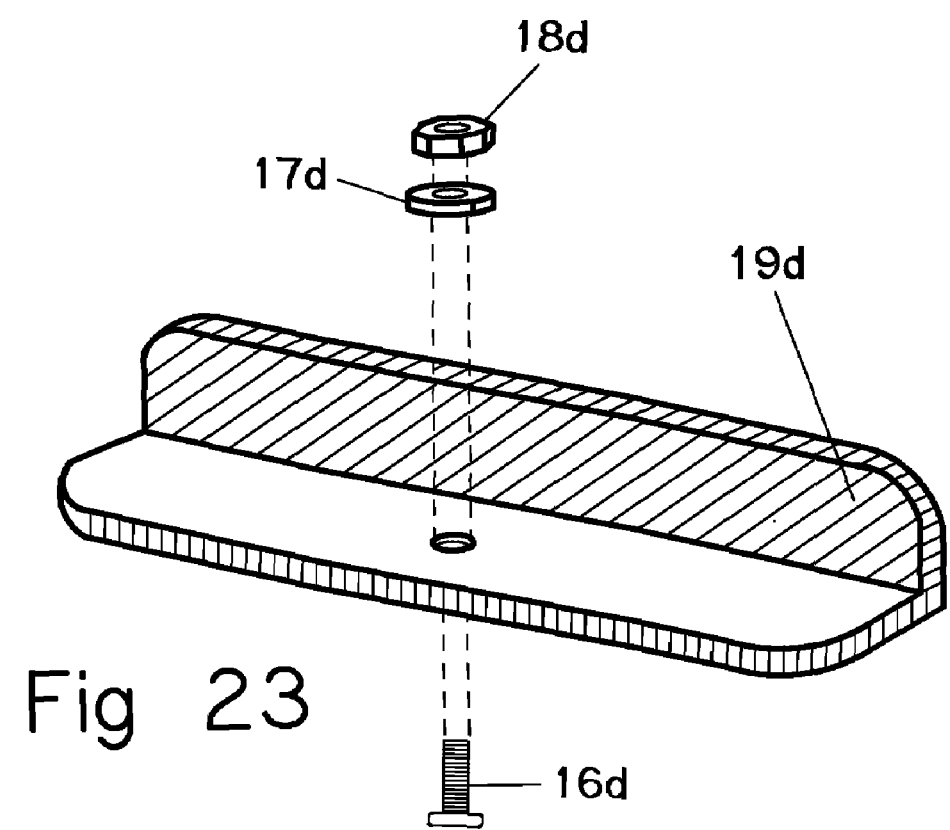
Figure 24:
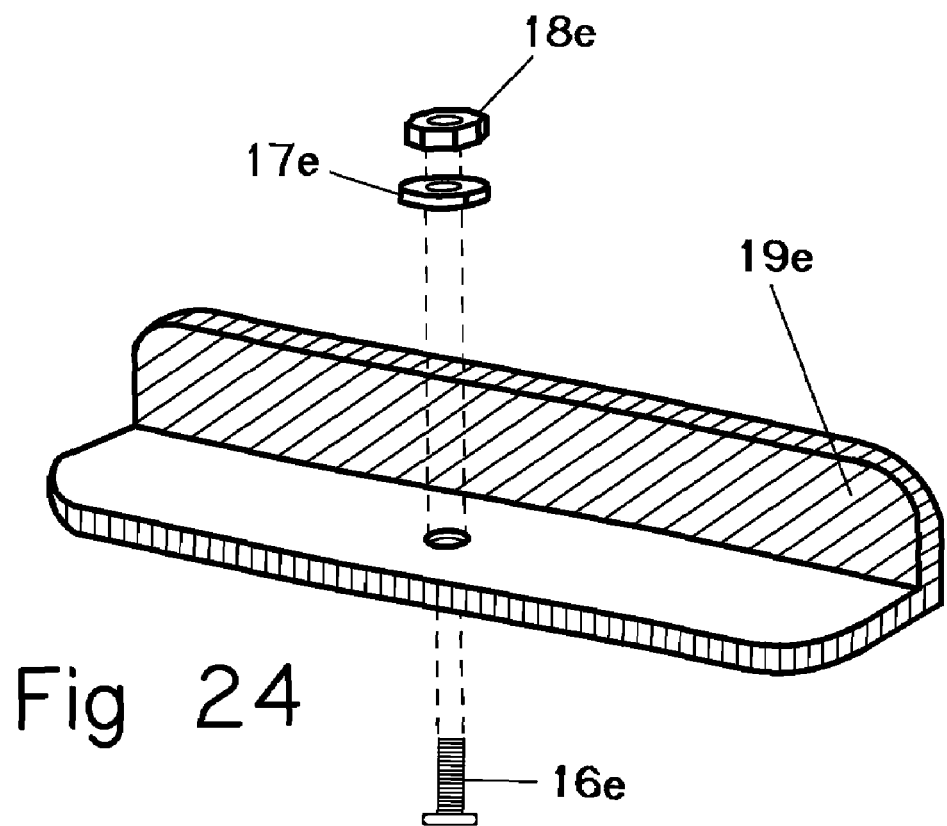
Figure 25:
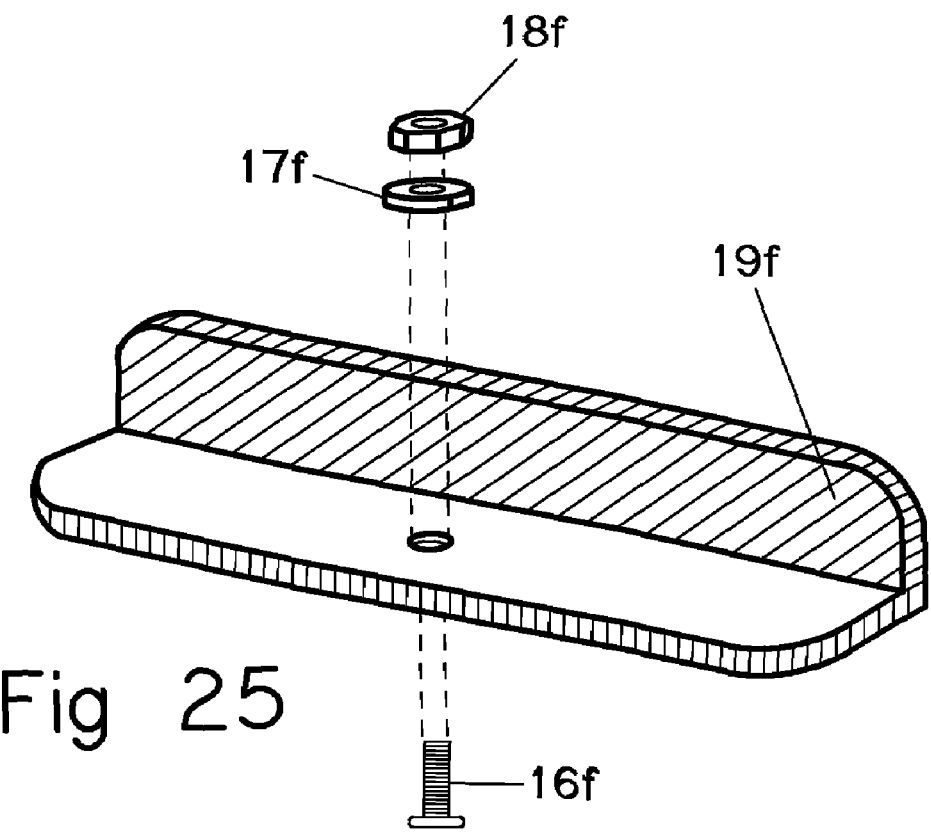
Figure 26:
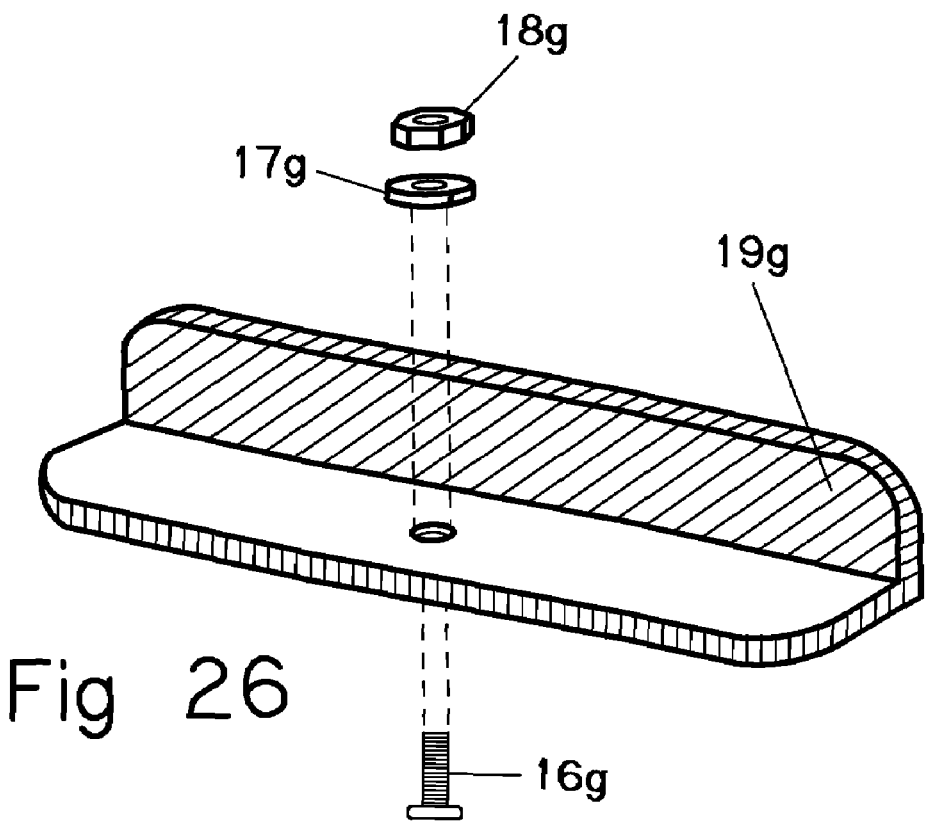
Figure 27:
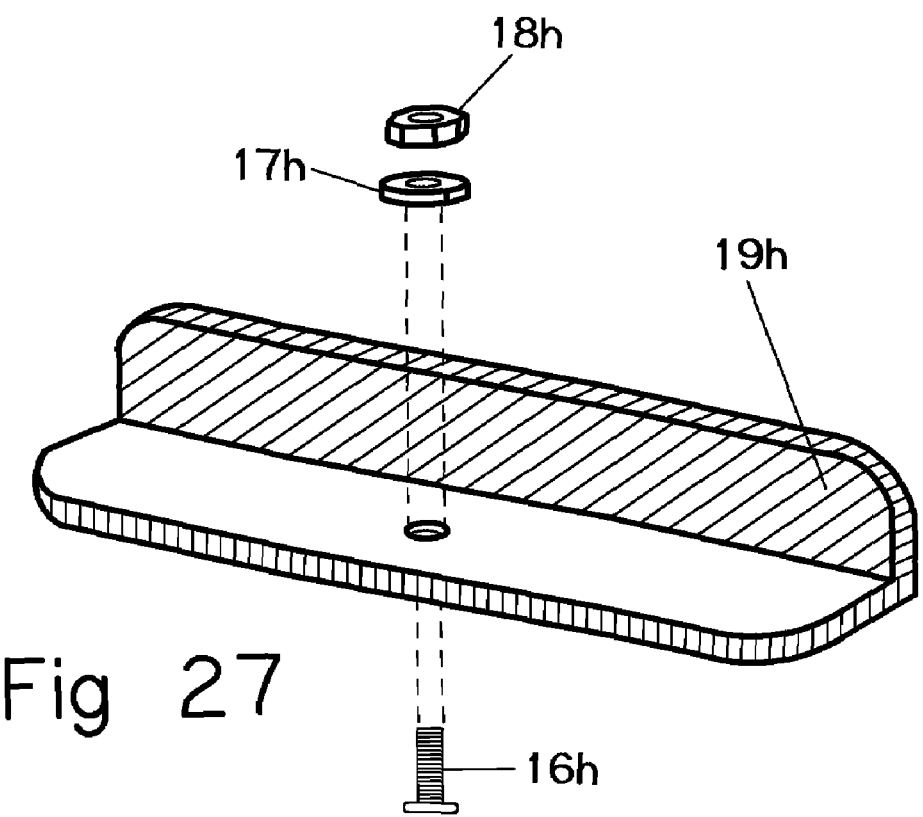

The sliding guide rail stops 19a thru 19h are preferably constructed from rigid elongated metal material, having a substantially straight, flat, horizontal surface and a substantially straight, flat, vertical surface. A hole is drilled into each sliding guide rail stop so that each male-threaded fastener, preferably t-bolts, 16a thru 16h, being slidably engaged with one of the tracks 4a or 4b, can extend thru each sliding guide rail stop as can be seen in FIG. 19. T-bolts 16a thru 16h have female-threaded receivers, preferably nuts 18a thru 18h. The female-threaded receivers have a means to hold the female-threaded receivers in place, preferably lock washers, 17a thru 17h, thus allowing the sliding guide rail stops to be secured in place during use. Preferably, sliding guide rail stops 19a thru 19h have rounded corners shown in FIG. 20 thru 27.

Figure 41:
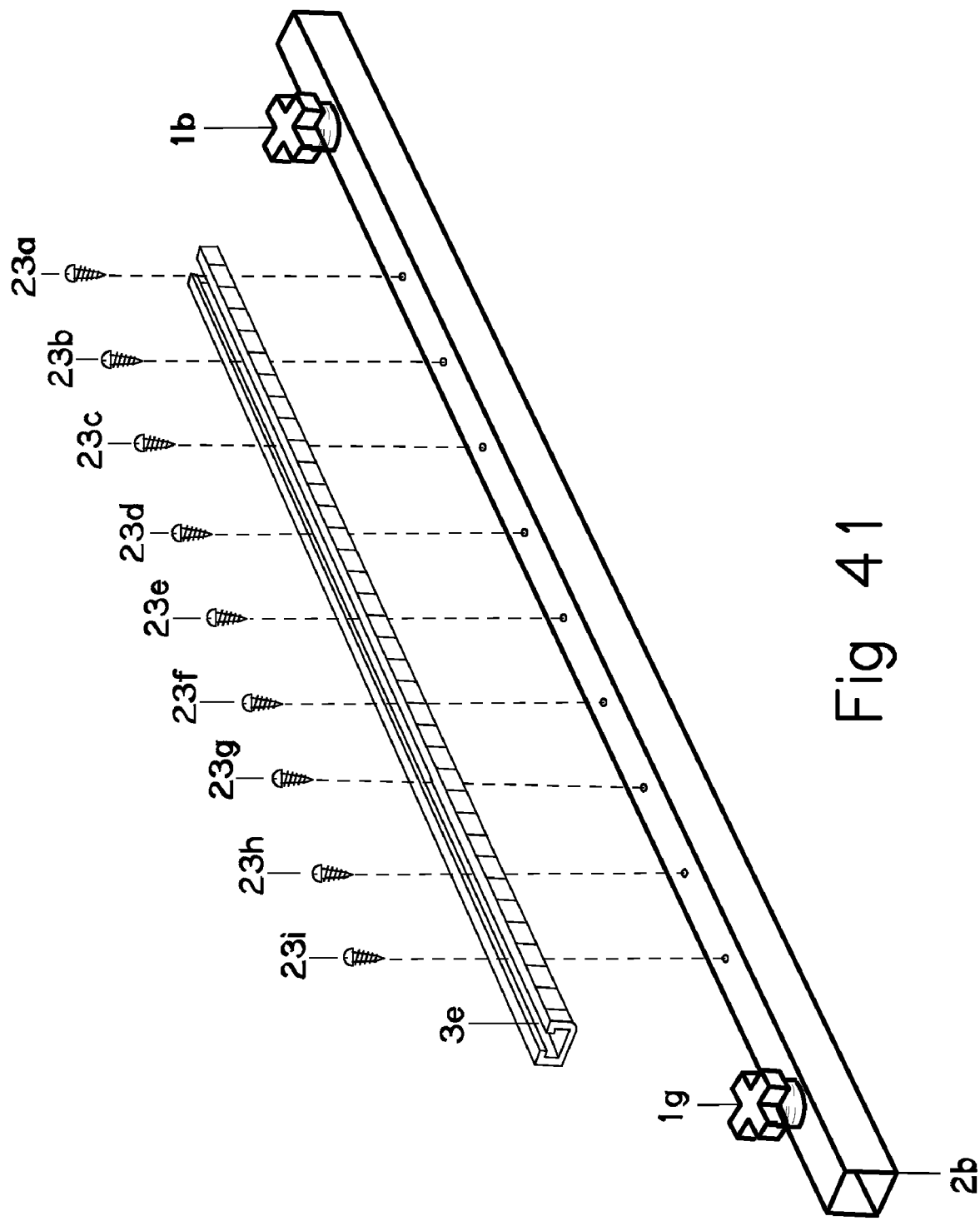

Fliparm router stop track 3e is installed on one of the sliding guide rails. As shown in FIG. 41, track 3e is fastened to the top of sliding guide rail 2b with fastening means, preferably screws, 23a thru 23i.

The base plate 7 is preferably constructed of an elongated, substantially straight, flat, rigid metal material that has a predetermined length, width and thickness. The fixed rotating mounting cylinder sleeves 8a and 8b for the fliparm router stop 66 are preferably constructed from rigid metal material, being substantially straight, and having a substantially round hollow interior with a predetermined diameter and length. The length of the fixed rotating mounting sleeves 8a and 8b are long enough to accept a male-threaded fastener, preferably t-bolts 24a and 24b, and a fastening means, preferably screws 25a and 25b, to fasten the sleeves to the base plate 7, while having space to receive the rotating mounting cylinder 9.

The rotating mounting cylinder 9 is preferably constructed of a rigid, substantially straight, round, solid metal material. The rotating mounting cylinder 9 has a notch that will receive the fliparm 6 and has the length to receive the fixed rotating mounting cylinder sleeves 8a and 8b.

Figure 30:
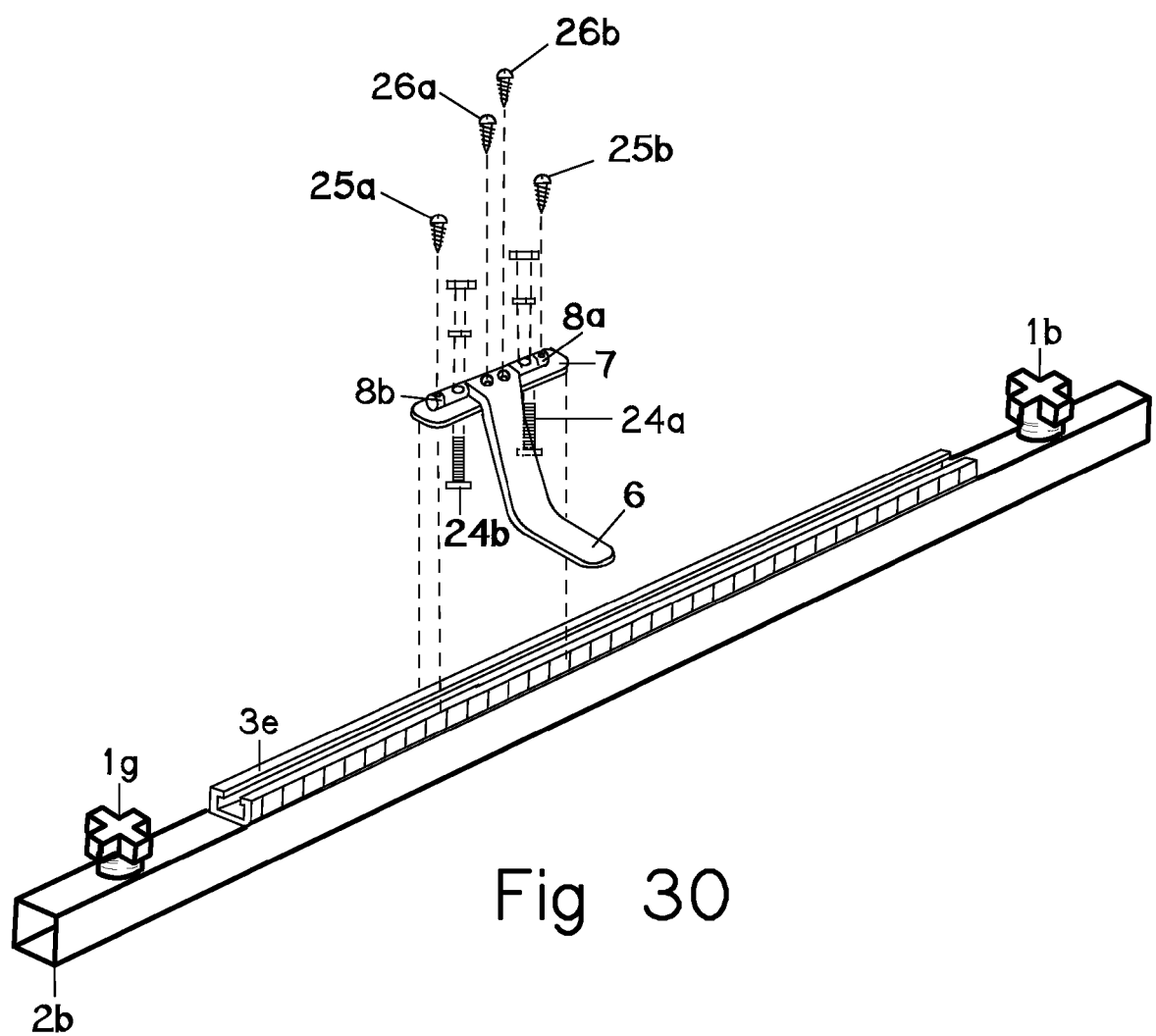
FIG. 30 shows a perspective view of the fliparm router stop 66 assembly.
Figure 31:
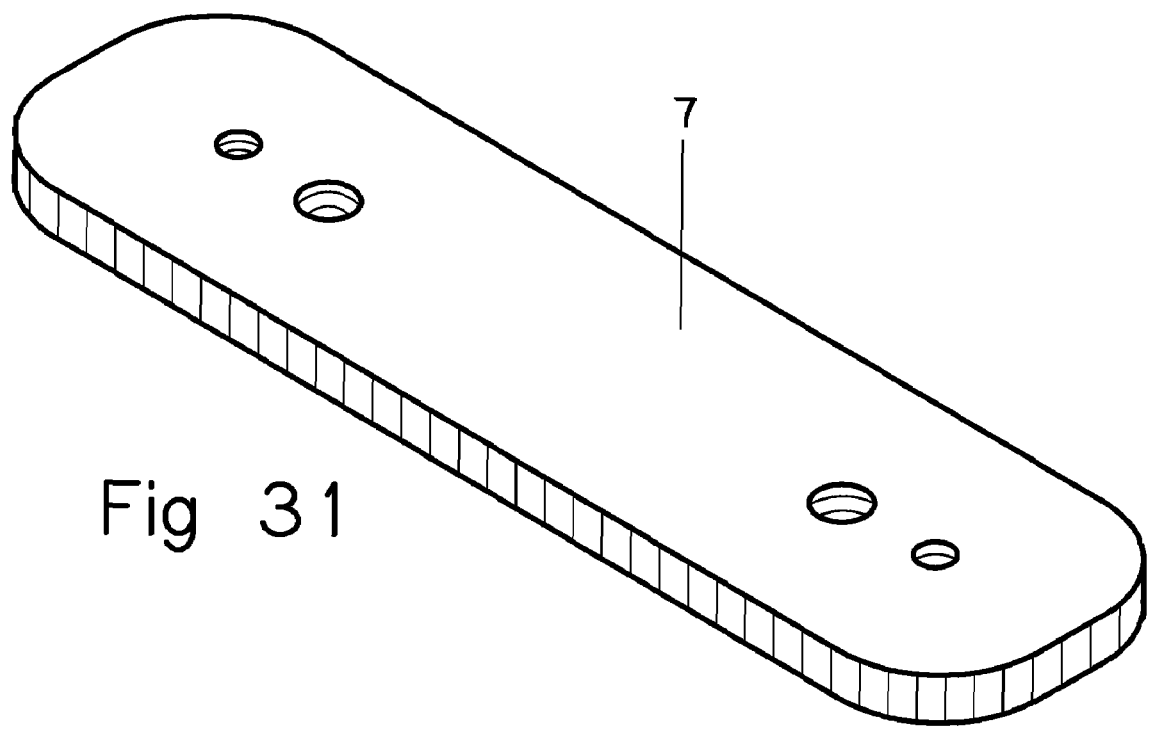
FIG. 31 shows a perspective view of the base plate 7 for the fliparm router stop.
Figure 32:
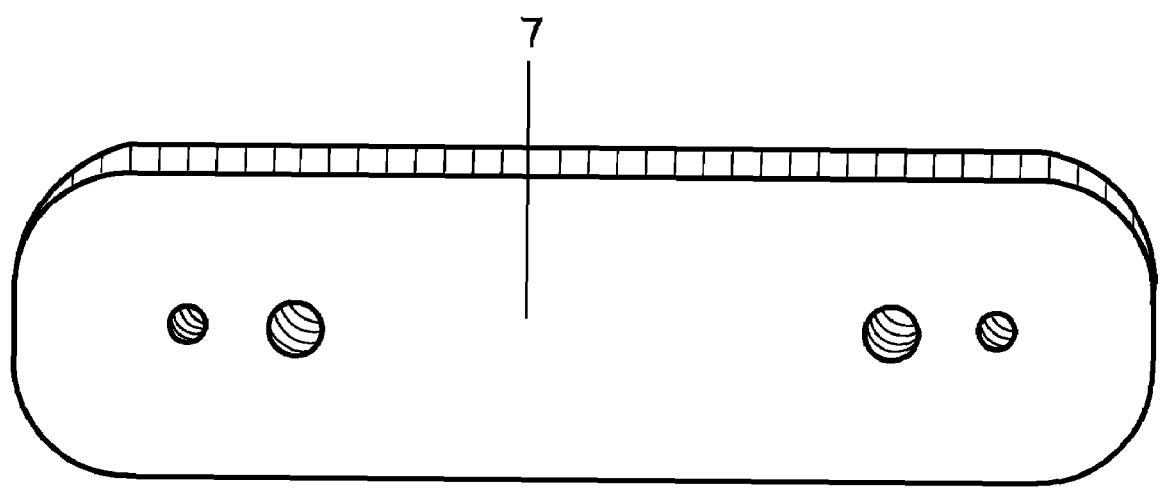
FIG. 32 shows a topside view of the fliparm router stop base plate 7.
Figure 33:
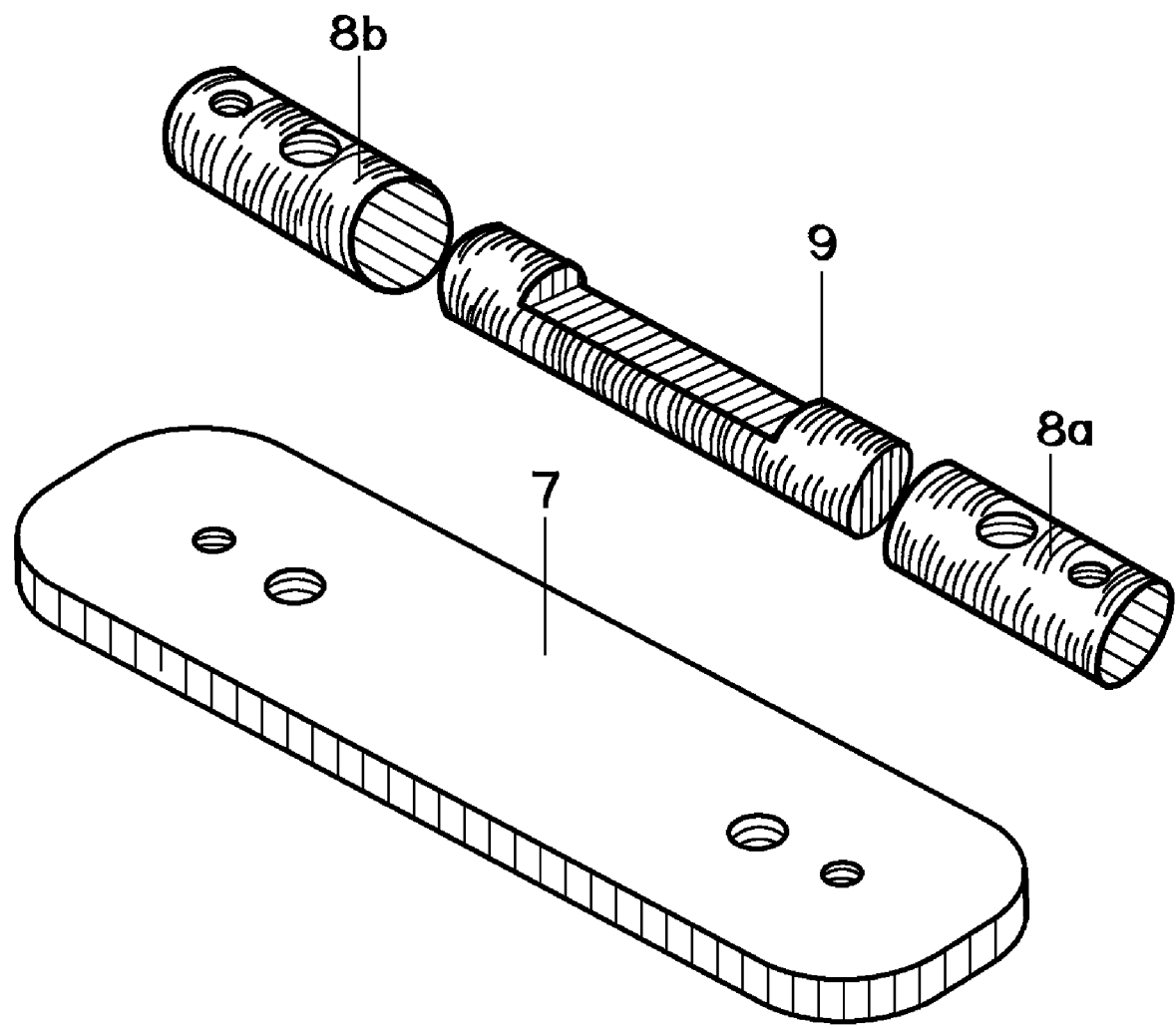
FIG. 33 shows exploded view of fixed rotating mounting cylinder sleeves 8a and 8b, the rotating mounting cylinder 9 and the base plate 7 for the fliparm router stop 66.
Figure 34:
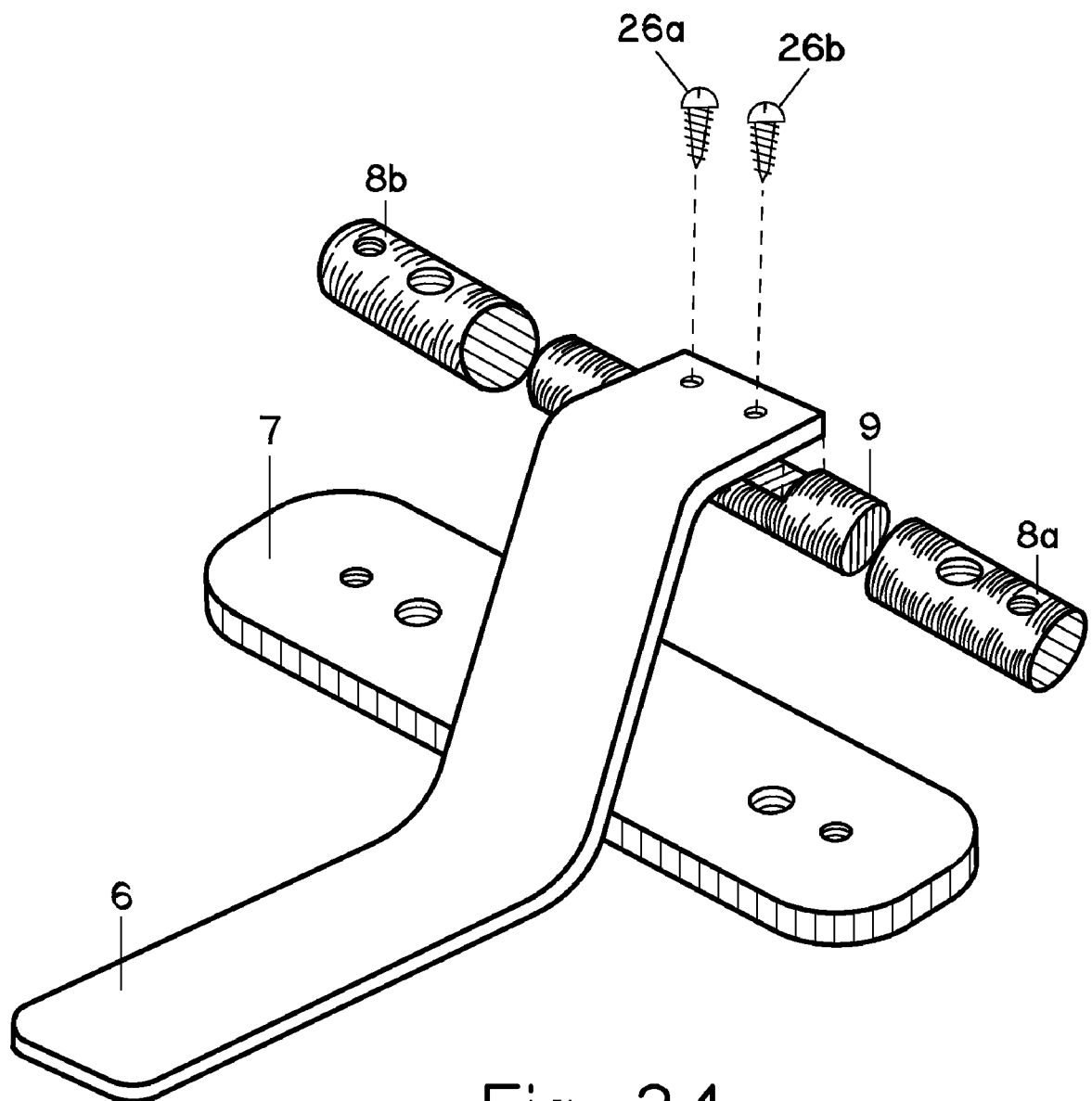
FIG. 34 shows exploded view of where the fliparm 6 is attached on the rotating mounting cylinder 9.
Figure 35:
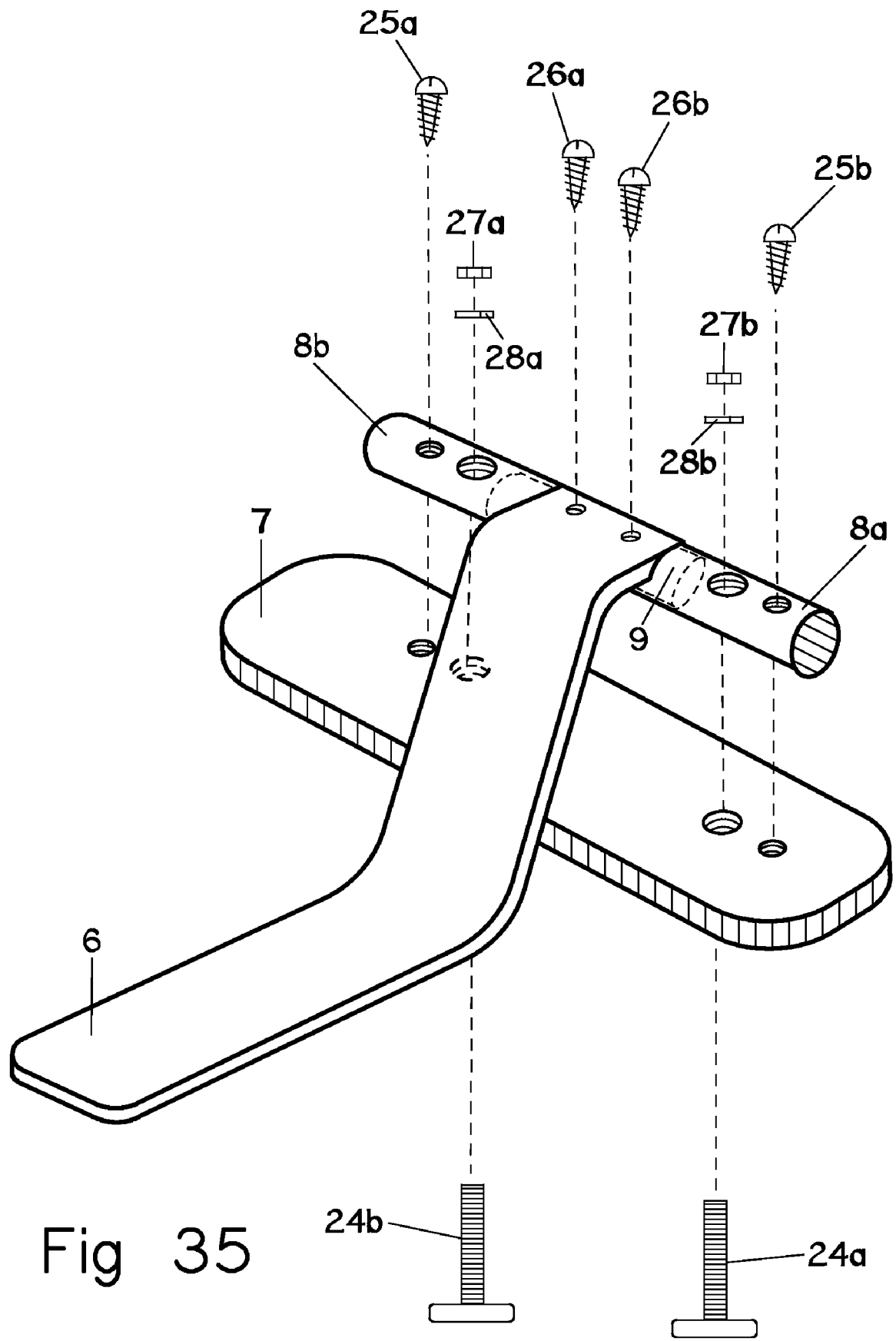
FIG. 35 shows exploded view of fliparm router stop 66 ready for complete assembly.
Figure 36:
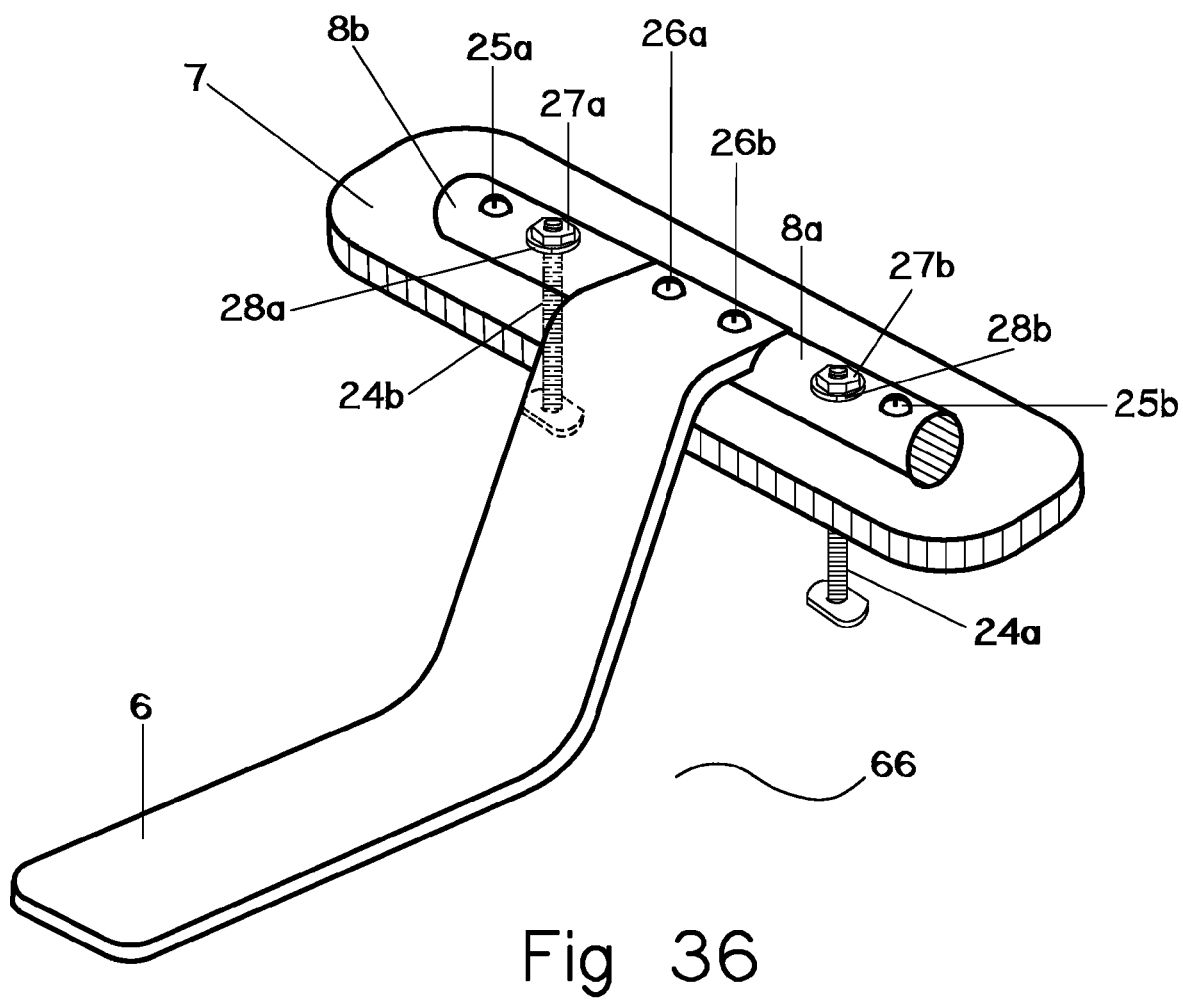
FIG. 36 shows perspective view of assembled fliparm router stop 66.

The fliparm 6 is preferably constructed from a substantially flat, straight, rigid metal material. While the fliparm stop is still flat, one end of the stop is rounded as seen in FIG. 34. At the opposite end of the fliparm 6, the first bend is approximately ⅞" from the end with the square corners. The first bend on the fliparm is approximately 60 degrees. The second bend will be approximately 2¼" from the first bend and will be approximately 62 degrees. The fliparm should look similar to FIG. 34. The fliparm 6 can be fastened to the rotating mounting cylinder with fastening means, preferably screws 26a and 26b. The sleeves 8a and 8b should now slide over the rotating mounting cylinder 9, stopping against the fliparm 6 as shown in FIG. 35. The parts of the fliparm router stop 66, which include the rotating mounting cylinder 9, fliparm 6 and fixed rotating mounting cylinder sleeves 8a and 8b can be fastened to the base plate 7 with fastening means, preferably screws 25a and 25b. Holes that can accommodate a male-threaded fastener are drilled in each sleeve. Male-threaded fasteners, preferably t-bolts 24a and 24b, can be put into place with female-threaded receivers, preferably nuts 27a and 27b, which can be secured with securing means, preferably lock washers 28a and 28b. Now the assembled parts can be slid into the fliparm router stop track 3e as seen in FIG. 1 and FIG. 30.

To operate the dadoing system, a workpiece must first be placed onto the upper surface of the system 11a. In this example it will be shown how the dadoing system will be set up for dadoing a side of an upper cabinet with thru dados. The first step will be sliding the sliding channel clamp 5 to one side of the system, which will allow the workpiece to be slid into position. The top edge of the workpiece 10 should abut the side of squaring rail 13b, while the right side of the workpiece 10 is abutting the squaring rail 13c. Now the sliding channel clamp 5 can be pushed against the left edge of the workpiece 10. The sliding channel clamp 5 should not be so tight against the workpiece 10 that the workpiece cannot be easily removed from the system. There should not be any play between the workpiece 10 and the sliding channel clamp 5. Each male-threaded fastener, preferably t-bolts 20a thru 20d, has a means for securing female-threaded receivers in place, preferably lock washers 21a thru 21d shown in FIG. 39. Each male-threaded fastener 20a thru 20d also has a female-threaded receiver, preferably nuts 22a thru 22d in FIG. 39. Each male-threaded fastener can now be tightened down with a ratchet. The setup for the sliding guide rails 4a and 4b is very simple.

The tracks 4a and 4b both having calibrated measurement means, which will aid in lining the sliding guide rails 2a thru 2d up at the point where the dados are needed. The guide rails 2a thru 2d must be set so that the center of the router bit 30 will be in the center of the dado that needs to be cut. The sliding guide rails 2a thru 2d have female-threaded receivers shown as knobs 1a thru 1h that are tightened down as each sliding guide rail is set in place.

Figure 48:
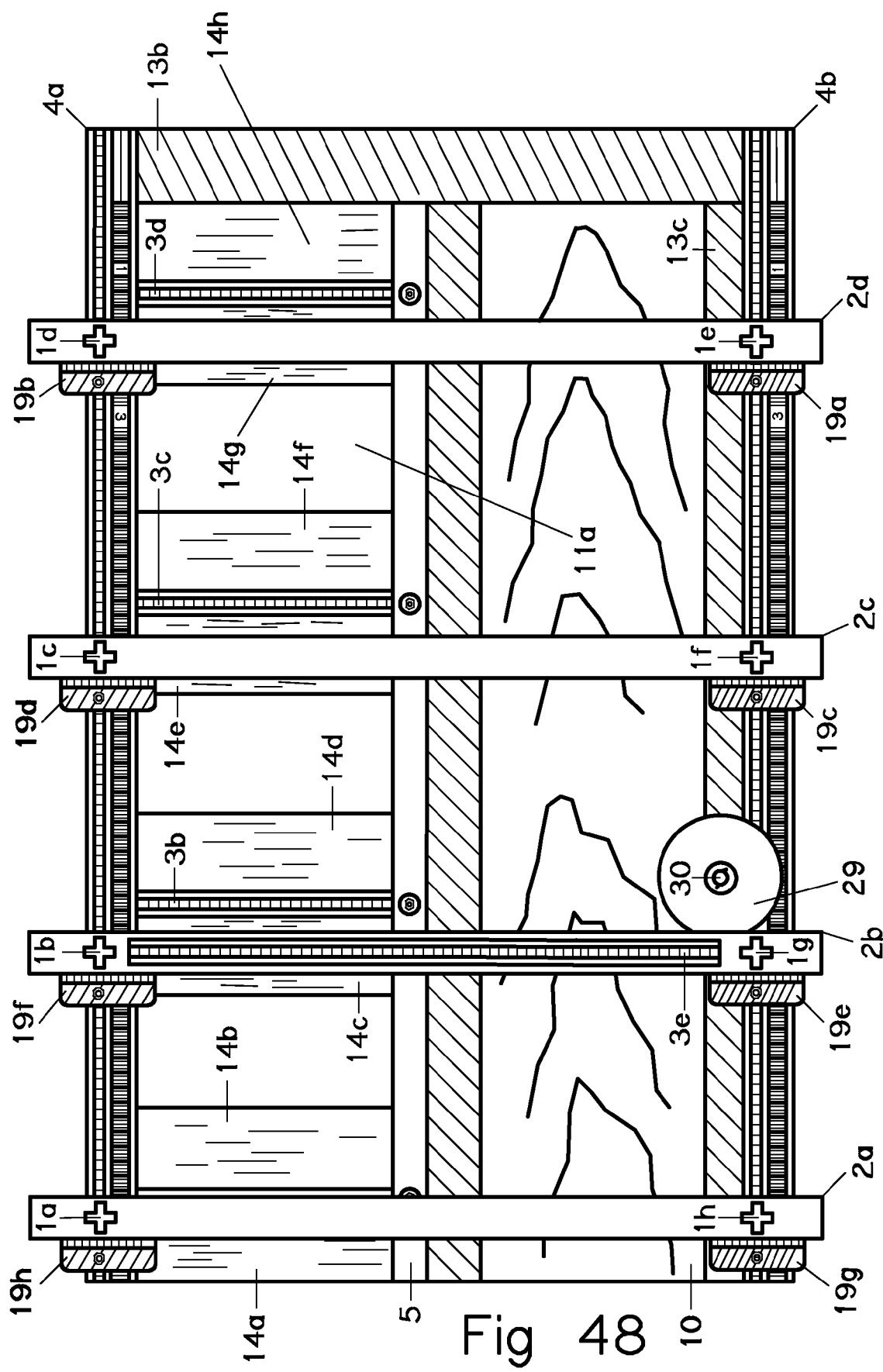
FIG. 48 shows top view of dadoing system set up for a thru dado.
Figure 49:
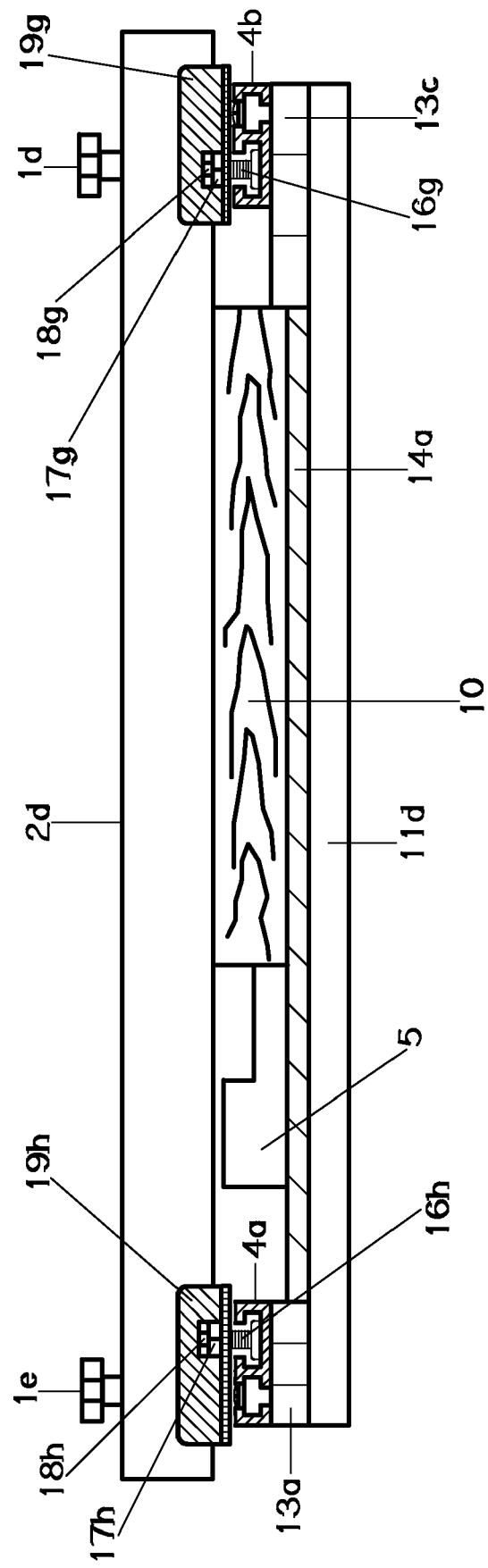
FIG. 49 shows open-end view of dadoing system with workpiece 10 secured into place.

As each sliding guide rail 2a thru 2d is tightened down, the sliding guide rail stops 19a thru 19h are placed on the backside of the sliding guide rails, with the vertical side of the sliding guide rail stops abutting the vertical back side of the sliding guide rails and then being tightened down as shown in FIG. 48. This is done so that when all of the dados are cut into the workpiece 10 and the workpiece is ready to be removed from the dadoing system; which is done by loosening the female-threaded receivers 1e thru 1h and sliding the workpiece 10 out, the stops allow the sliding guide rails to be secured in the same place as the previous workpiece.

Figure 50:
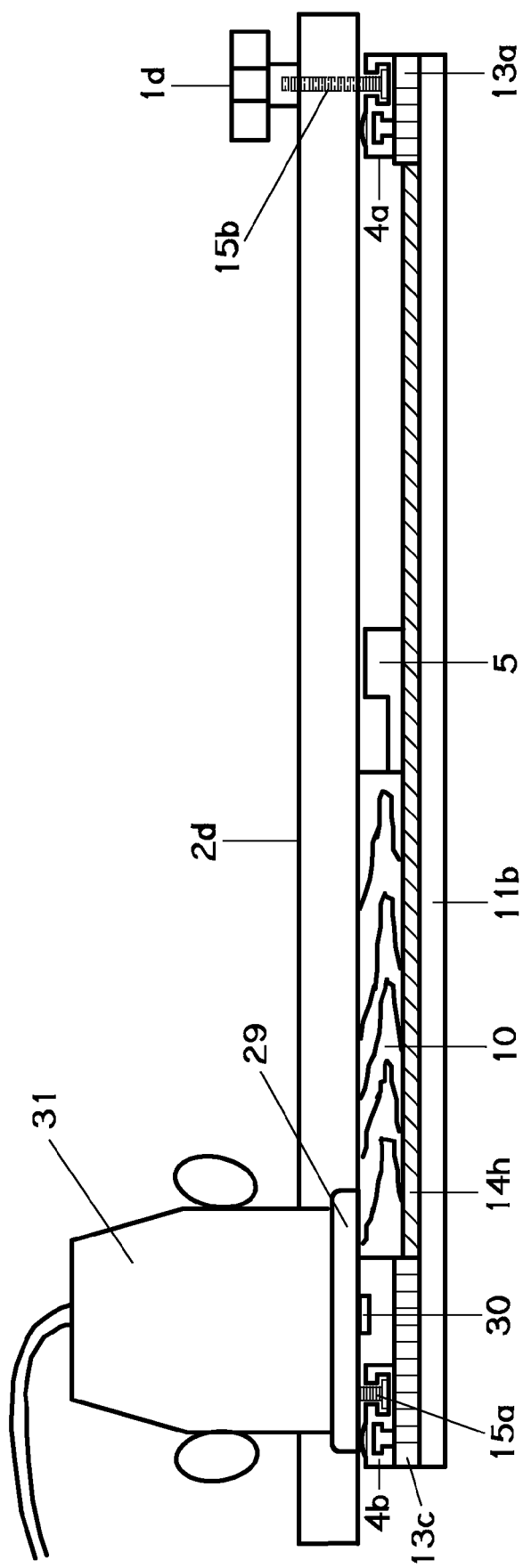
FIG. 50 shows cross section of dado system showing the starting point of the router when cutting a thru dado.
Figure 51:
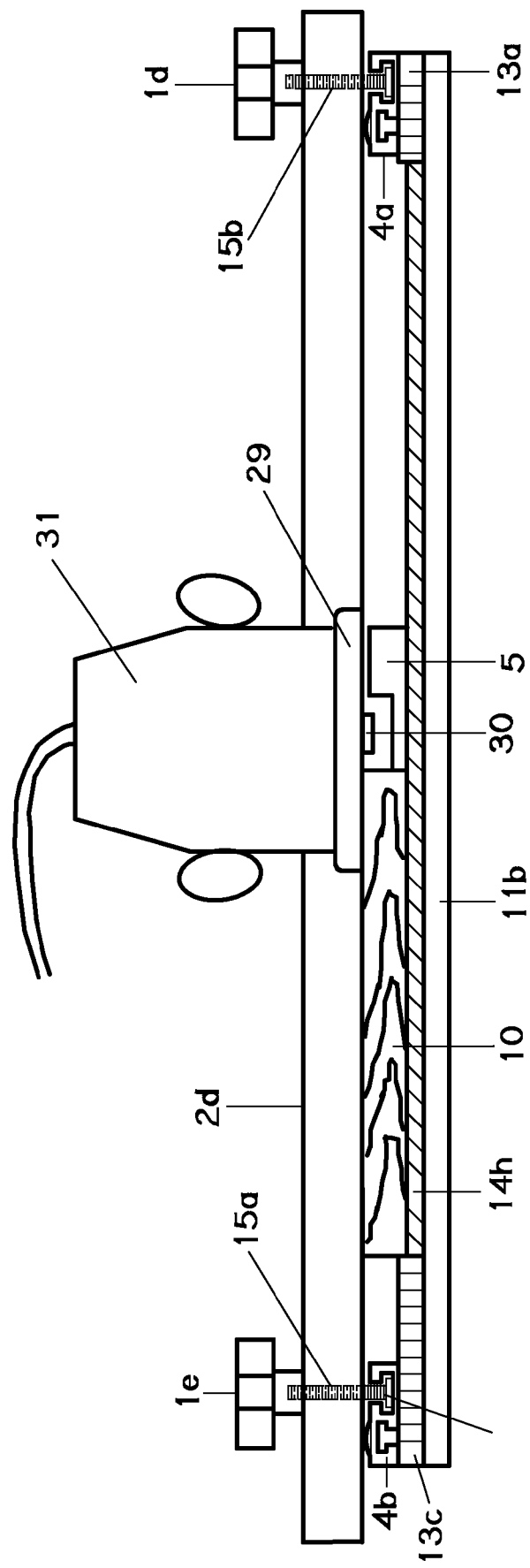
FIG. 51 shows cross section of the dado system depicting where the router will be after the dado has been cut.
Figure 52:
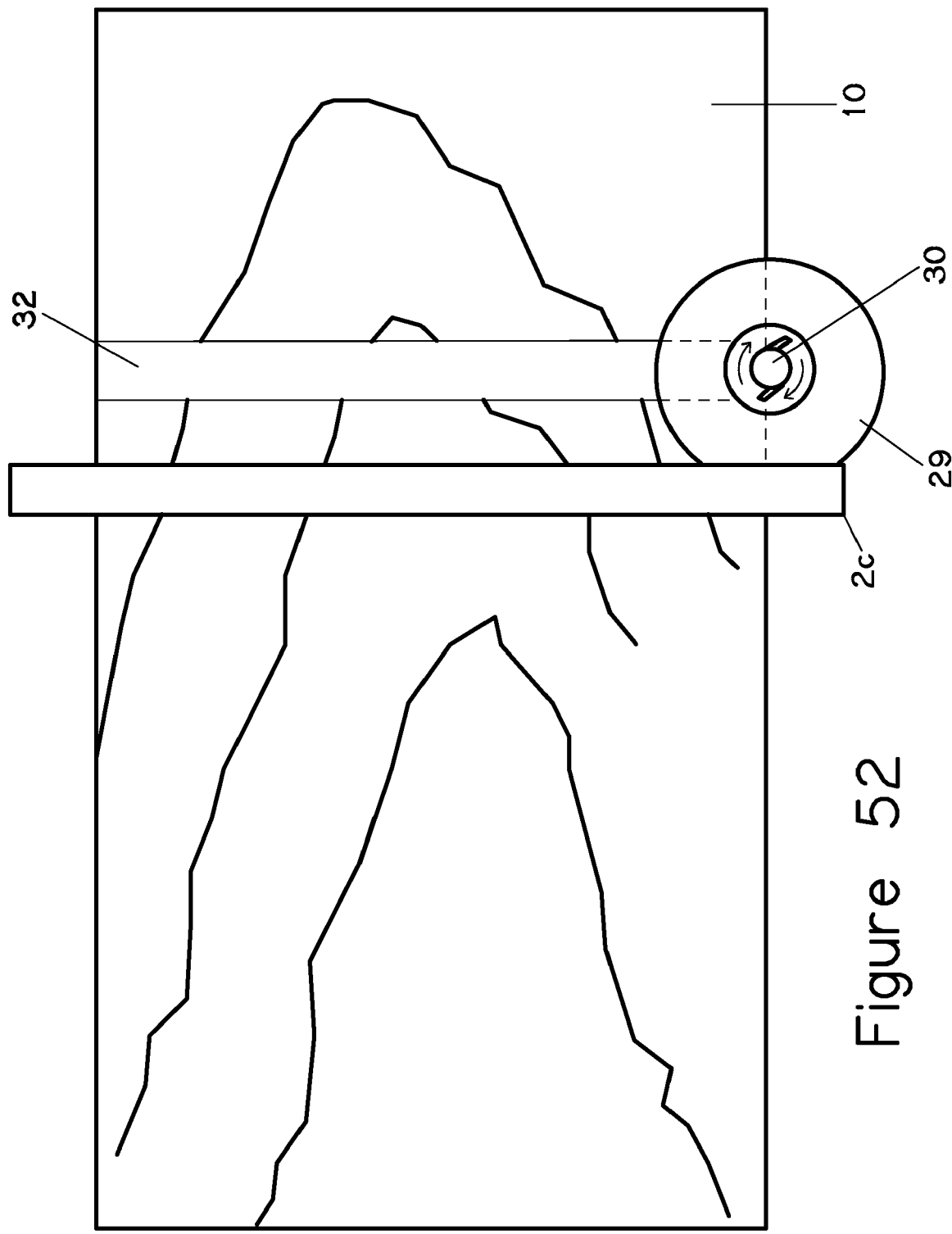
FIG. 52 shows the top view of the workpiece showing how the router bit pulls the router against the sliding guide rail 2c of the dadoing system.

The sliding channel clamp 5 does not have to be loosened to remove or reinsert a new workpiece. When the new workpiece has been slid into place, sliding guide rail 2d can be pushed up against guide rail stop 19a and tightened down. The same procedure should be followed with sliding guide rail 2c and guide rail stop 19c; follow these procedures until all four sliding guide rails have been tightened down. The setup would look similar to FIG. 48. Looking at FIG. 50, which shows a cross section of what the set up would look like before the router 31 and router bit 30 starts its cut into the workpiece. Looking at FIG. 51, which is the same cross section showing where the router 31 and router bit 30 will be after the dado has been made. Looking at FIG. 52 it can be seen how the rotation of the router bit 30 pulls the router into the sliding guide rail 2c leaving a straight clean dado 32. Only the base plate 29 of the router is shown in FIG. 52.

Figure 46:
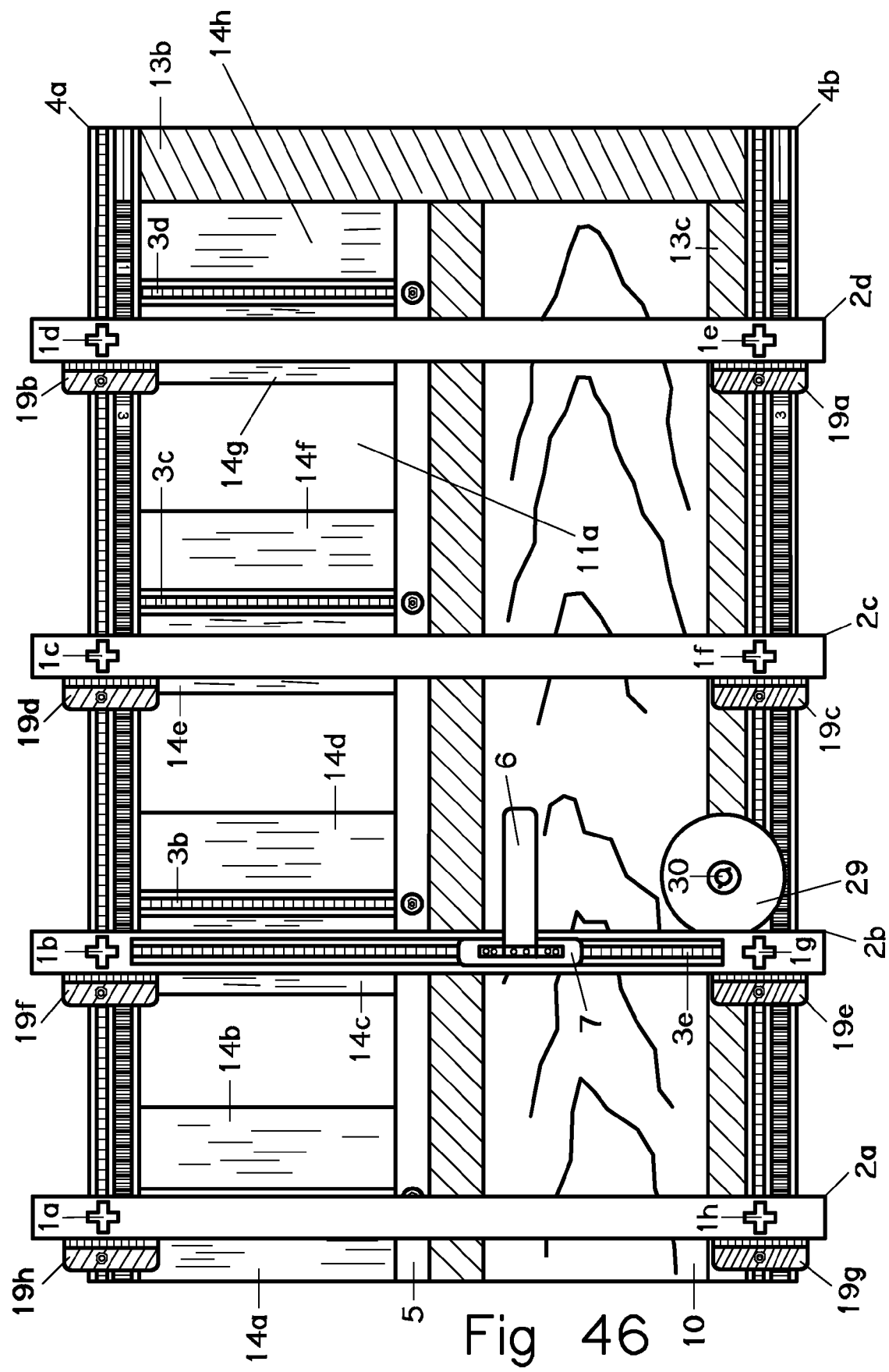
FIG. 46 shows top view of dadoing system set up for a left hand stop dado.
Figure 47:
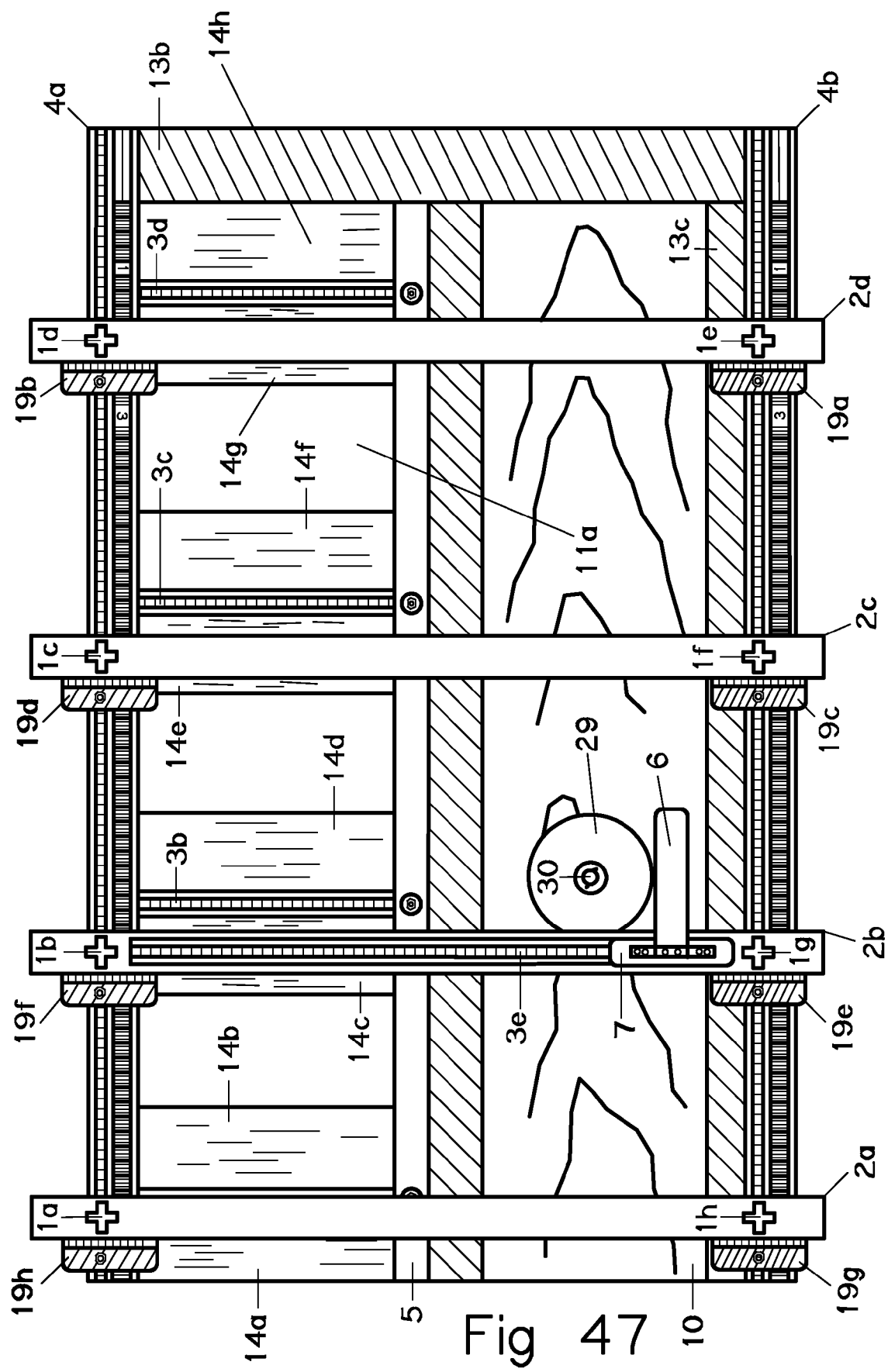
FIG. 47 shows top view of dadoing system set up for a right hand stop dado.

For cutting stop dados in workpiece 10 the fliparm router stop 66 is set up so that it can stop the forward progress of the router at the desired location as seen in FIG. 46. For cutting the opposite stop dado in the workpiece 10, the fliparm router stop 66 will be set up as shown in FIG. 47 and the router bit 30 will be plunged into the workpiece; then the router 31 will be moved forward until the router bit is clear of the workpiece as shown in FIG. 51.

It is to be understood that while certain forms of the present invention have been illustrated and described herein, it is not to be limited to the specific forms or arrangement of parts described and shown. For example, knobs 1a thru 1h could be replaced with wing nuts or nuts with lock washers or lock washers could be used with the knobs 1a thru 1h. Another alternative way would be to make the sliding guide rails 1a thru 1d from rigid metal with one substantially straight vertical side and one substantially straight horizontal side. Another alternative way would be to have one end of the base open and the other end, squaring rail 13b, would be removable, this would allow for longer workpieces to be dadoed. Also if desired, the dados 12a thru 12d could be eliminated and tracks 3a thru 3d could be fastened directly to the upper portion of the base 11a.

PART DESCRIPTION FOR DADOING SYSTEM

Parts 1a thru 1e—Female-threaded receivers—Knobs for tightening down the sliding guide rails (parts 2a thru 2d).
Parts 2a thru 2d—Sliding guide rails—Guide for the router to follow when cutting dados into a workpiece.
Parts 3a thru 3e—Incra T-Track.
Parts 4a and 4b—Incra T-Track Plus—T-Track has a measuring tape built into the T-Track that is used for lining up the guide rails on the dadoing system.
Part 5—Sliding channel clamp—Used to help secure workpiece in place.
Part 6—Fliparm—The arm of the fliparm router stop.
Part 7—Base plate. The base plate holds the fliparm router stop assembly in place and allows the fliparm router stop to be tightened down in any desired location on the fliparm router stop track.
Part 8a and 8b—Fixed rotating mounting cylinder sleeves—Slide over and hold the rotating mounting cylinder (Part 9) in place. Sleeves are fastened to base plate (Part 7).
Part 9—Rotating mounting cylinder—Solid material having a notch for receiving fliparm (part 6) of the fliparm router stop assembly.
Part 10—Workpiece—Material that needs a thru dado or a stop dado cut into the workpiece for receiving a shelf.
Part 11 thru 11d—11—The complete base of the system. (four edges and one upper survace and one lower surface.
   11a—Upper portion of the base of the dadoing system.
   11b—Right edge or right end of the base of the dadoing system.
   11c—Front edge or front of the base of the dadoing system.
   11d—Left edge or left end of the base of the dadoing system.
Part 12a thru 12d—Dados—Rectangle grooves that the T-Track will sit into; which will help stabilize the T-Tracks once they are fastened to upper surface of the base of the daoing system.
Part 13a thru 13c—Squaring rails—Squaring rails keep the workpiece square and also are used to help hold the work piece in place.
Part 14a thru 14h—Risers. The risers raise the workpiece up off of the base of the dadoing system. This allows the work piece and the sliding channel clamp to clear the T Tracks that are fastened to the upper surface of the base of the dadoing system.
Part 15a thru 15h—T-bolts or male-threaded fasteners are used to secure the sliding guide rails (2a thru 2d) in predetermined areas of the base on the dadoing system.
Parts 16a thru 16h—T-bolts or male-threaded fasteners are used to tighten down the guide rail stops in any desired position. (Parts 19a thru 19h are the guide rail stops).
Part 17a thru 17h—Lock washers—Means to keep female-threaded receivers (18a thru 18h) or nuts from working loose during use.
Parts 18a thru 18h—Nuts—female-threaded receivers that hold the guide rail stop in place.
Parts 19a thru 19h—Sliding guide rail stops. Allows the sliding guide rails to be tightened down in the same spot for repeating matching dados.
Parts 20a thru 20d—T-bolts—Male-threaded fasteners use to tighten down the sliding channel clamp.
Parts 21a thru 21d—Lock washer—Means for keeping nuts (female-threaded receivers) from working loose.
Parts 22a thru 22d—Nut—Female-threaded receiver used to tighten down the sliding channel clamp (Part 5).
Parts 23a thru 23i—Screws. Fastening means used to attach T-Track (Part 3e) onto sliding guide rail.
Parts 24a and 24b—T bolts—Male-threaded fasteners used to tighten down fliparm router stop (Part 66).
Parts 25a and 25b—Screws—Fastening means used to attach sleeves (Parts 8a and 8b) to the base plate (Part 7).
Parts 26a and 26b—Screws—Fastening means used to attach fliparm (Part 6) to the base plate (Part 7).
Parts 27a and 27b—Nuts—Female-threaded fastener used to tighten down fliparm router stop assembly.
Parts 28a and 28b—Lock washers—Means used to keep nuts (female-threaded receivers) from working loose on fliparm router stop assembly.
Part 29—Router base plate—Shows a better view of how the router rides against the sliding guide rail.
Part 30—Router bit.
Part 31—Router.
Part 32—Dado. Shows a thru dado cut into the workpiece.
Part 66—Fliparm router stop—Used for stopping forward motion of router when making a stop dado and as starting point for making the opposite mating dado.

What is claimed is:

1. A dadoing system for guiding a router on a workpiece comprising:
   (a) a base constructed of rigid material with a substantially planar upper and lower surface, said base having a predetermined width, length, and thickness, having at least one open end for receiving a workpiece;
   (b) a plurality of squaring rails being of rigid substantially straight material, having a predetermined width, length and thickness, and said squaring rails being fastened on said base defining an area to receive a workpiece;
   (c) a first and second substantially straight, parallel, longitudinally extending tracks, being spaced apart on said squaring rails further defining the area for receiving a workpiece, and said tracks having calibrated measurement means associated with said tracks providing visible indication or location along each said track;
   (d) a plurality of sliding channel clamp tracks, having a predetermined length and being fastened to the upper surface of said base, each said track transversing the area for receiving a workpiece;
   (e) a plurality of sliding guide rails comprising of elongated, rigid, substantially straight stock, having at least one substantially straight horizontal surface, and at least one substantially straight vertical surface, transversely extending over the area to receive a workpiece, with one end of each said sliding guide rail being slidably engaged with said first track and the opposite end being slidably engaged with said second track;

(f) at least one sliding channel clamp being of elongated, rigid, and substantially straight material, having a predetermined length, width, thickness, and said sliding channel clamp being slidably engaged with said sliding channel clamp tracks;

(g) at least one sliding guide rail track fastened to one of at least one said sliding guide rail;

(h) at least one fliparm router stop, being slidably engaged with one of said sliding guide rail tracks;

(i) a plurality of risers being of substantially straight, rigid material, having a predetermined length, width and thickness, each riser being fastened in a predetermined area of said base;

(j) a plurality of sliding guide rail stops being slidably engaged with said first and second tracks; each said sliding guide rail stop being of a elongated, rigid material, having at least one substantially straight, horizontal surface and at least one substantially straight vertical surface, having a predetermined length, width and thickness, and the vertical side of said guide rail stops abutting one vertical side of said sliding guide rails.

2. The dadoing system of claim 1
wherein said base further consisting:
(a) a plurality of rectangle grooves transversing the upper surface of said base, being spaced in predetermined areas of said base, and said rectangle grooves having predetermined depth, width and length for receiving said sliding channel clamp tracks;
(b) plurality of said squaring rails, a first squaring rail being fastened in a transverse direction on one end of said base, a second and third said squaring rail being in a spaced apart relationship on adjacent opposite sides of said base, said second and third squaring rails being fastened in a longitudinal direction on said base, and one end of second and third squaring rails abutting said first squaring rail, defining the area for receiving a workpiece.

3. The dadoing system of claim 2
wherein said rectangle grooves transversing upper surface of said base, receive said sliding channel clamp tracks, wherein said tracks being received by said grooves, then being fastened to upper surface of said base, whereby stabilizing said sliding channel clamp tracks.

4. The dadoing system of claim 1
wherein said first and second tracks having a predetermined length, being spaced apart on opposite sides of said base, wherein said first and second tracks being fastened in a longitudinal direction on said second and third squaring rails, whereby further defining the area for receiving a workpiece.

5. The dadoing system of claim 1
wherein said sliding guide rails comprising of elongated, rigid, hollow and substantially square shaped stock having a horizontal top surface, a horizontal bottom surface, and two vertical sides.

6. The dadoing system of claim 5
wherein said sliding guide rails further comprising:
(a) at least one hole in a predetermined area on each end of said sliding guide rails to accept a male-threaded fastener of sufficient length extending from said first track, and a second male-threaded fastener of sufficient length extending from said second track, and each male-threaded fastener extending thru one end of said sliding guide rails;
(b) at least one male-threaded fastener of sufficient length; and
(c) at least one female-threaded receiver threadably receiving said male-threaded fastener, whereby each end of said sliding guide rails can be secured in place during use and released to remove workpiece.

7. The dadoing system of claim 1
wherein said fliparm router stop comprising:
(a) at least one base plate of a elongated, rigid, substantially straight material, having a predetermined width, length and thickness, wherein said base plate having at least one hole at a predetermined location on each end of said base plate to accept a male-threaded fastener;
(b) at least one rotating mounting cylinder of a elongated, solid, rigid and substantially straight material, having a predetermined diameter and length, having a notch of a predetermined length and depth in a predetermined location on said rotating mounting cylinder;
(c) at least one fixed rotating mounting cylinder sleeve of a elongated, hollow, rigid and substantially straight material, having at least one open end, having a predetermined diameter and length that will slide over said rotating mounting cylinder, wherein said fixed rotating mounting cylinder sleeve having at least one hole to accept a male-threaded fastener, and at least one hole to accept a fastening means to fasten said fixed mounting cylinder sleeve to said base plate;
(d) at least one fliparm being of a rigid material, having a predetermined length, width and thickness, wherein said fliparm being constructed so that when said fliparm is down it will act as a stop or starting point for a router;
(e) at least one female-threaded receiver for receiving said male-threaded fastener;
(f) a means for securing at least one said female-threaded receiver in place when said female-threaded receiver is threadably receiving and securing said male-threaded fastener; and
(g) at least one male-threaded fastener, whereby said fliparm router stop is slidably engaged with one of at least one said sliding guide rail track, allowing said stop to transverse the area for receiving said workpiece, and allowing said stop to be secured in a desired location on said workpiece.

8. The dadoing system of claim 1
wherein said sliding guide rail stops further comprising:
(a) at least one hole in each said sliding guide rail stop to accept a male-threaded fastener;
(b) at least one female-threaded receiver for receiving said male-threaded fastener;
(c) at least one means for securing said female-threaded receiver in place when said female-threaded receiver is threadably receiving and securing said male-threaded fastener; and
(d) at least one male threaded fastener, whereby said sliding guide rail stops are slidably engaged with said first and second tracks, allowing said sliding guide rails to be secured in the same place, allowing repeat dados.

9. The dadoing system of claim 1
wherein said sliding channel clamp further comprising:
(a) a plurality of countersunk holes, each countersunk hole having at least one hole for receiving a male-threaded fastener;

(b) at least one female-threaded receiver for receiving said male-threaded fastener;

(c) at least one means for securing said female-threaded receiver in place when said female-threaded receiver is threadably receiving and securing said male-threaded fastener;

(d) at least one male-threaded fastener; and (d) said sliding channel clamp having a channel of a predetermined width, and depth; whereby the router bit can exit a workpiece without cutting into said sliding channel clamp.

10. The dadoing system of claim 1 wherein said risers be higher than said sliding channel clamp tracks; whereby said risers allow said sliding channel clamp to slide above said tracks.

11. A dadoing system for guiding a router on a workpiece comprising:

(a) a base constructed of rigid material, having parallel opposed major upper and lower faces, said base having a predetermined width, length, and thickness, and having at least one open end for receiving a workpiece;

(b) a plurality of squaring rails being of rigid substantially straight material, having a predetermined width, length and thickness, and said squaring rails being secured on said base defining an area to receive a workpiece;

(c) a first and second substantially straight, parallel, longitudinally extending tracks, being spaced apart on said squaring rails further defining the area for receiving a workpiece; wherein said tracks having calibrated measurement means associated with said tracks providing visible indication or location along each said track;

(d) a plurality of sliding channel clamp tracks, having a predetermined length and being fastened to the major upper surface of said base, each said track transversing the area for receiving a workpiece;

(e) a plurality of sliding guide rails comprising of elongated, rigid, substantially straight stock, having a least one substantially straight horizontal surface, and at least one substantially straight vertical surface, transversely extending over the area to receive a workpiece, with one end of each said sliding guide rail being slidably engaged with said first track and the opposite end being slidably engaged with said second track;

(f) at least one sliding channel clamp being of elongated, rigid, and substantially straight material, having a predetermined length, width, thickness, and said sliding channel clamp being slidably engaged with said sliding channel clamp tracks;

(g) at least one sliding guide rail track fastened to one of at least one said sliding guide rails;

(h) at least one fliparm router stop, being slidably engaged with one of at least one said sliding guide rail tracks;

(i) a plurality of risers being of substantially straight, rigid material, having a predetermined length, width and thickness, each riser being fastened in a predetermined area of said base;

(j) a plurality of sliding guide rail stops being slidably engaged with said first and second tracks; each said sliding guide rail stop being of a elongated, rigid material, having at least one substantially straight, horizontal and vertical surface, having a predetermined length, width and thickness, and said vertical surface of said sliding guide rail stops abutting one vertical surface of said sliding guide rails.

12. The dadoing system of claim 11 wherein said base further consisting:

(a) a front edge, back edge, left edge and right edge, wherein said edges having predetermined thickness, said base having a substantially flat major upper and lower surface;

(b) a plurality of dados transversing said major upper surface of said base, being spaced in predetermined areas of said base, and said dados having predetermined depth, width and length for receiving said sliding channel clamp tracks;

(c) a plurality of said squaring rails, at least one squaring rail being fastened in a transverse direction on one end of said base; a second and third said squaring rail being spaced apart on adjacent opposite sides of said base, said second and third squaring rails being fastened in a longitudinal direction on said base, and said second and third squaring rails abutting said first squaring rail, whereby said dados and squaring rails further define the area for receiving a workpiece.

13. The dadoing system of claim 12 wherein said sliding channel clamp tracks are secured in said dados by a fastening means; whereby said tracks being stabilized on major upper surface of said base.

14. The dadoing system of claim 11 wherein said first and second tracks having a predetermined length and width, being spaced apart in a parallel relationship on opposite sides of said base, wherein said tracks being fastened in a longitudinal direction on said squaring rails, whereby allowing said sliding guide rails to span the area for receiving a workpiece and being slidably engaged to said first and second tracks.

15. The dadoing system of claim 11 wherein said sliding guide rails being elongated, rigid, hollow and substantially straight, having a substantially flat upper and lower surface and two substantially flat vertical sides, whereby a router following said sliding guide rail will cut a substantially straight dado.

16. The dadoing system of claim 15 wherein said sliding guide rails further comprising:

(a) at least one hole in a predetermined area on each end of said sliding guide rails to accept a male-threaded fastener of sufficient length extending from said first track and a male-threaded fastener extending from said second track extending thru each end of said sliding guide rails;

(b) at least one male-threaded fastener; and (c) at least one female-threaded receiver threadably receiving at least one male threaded fastener; whereby allowing each end of said sliding guide rails to be secured in predetermined areas over a workpiece for guiding a router over said workpiece.

17. The dadoing system of claim 11 wherein said fliparm router stop comprising:

(a) a base plate having a substantially flat upper and lower surface, being of a rigid, substantially straight material, wherein said base plate having a predetermined width, thickness and length; said base plate having at least one hole in a predetermined area from each end of said base plate, wherein a male-threaded fastener can pass thru said base plate;

(b) at least one rotating mounting cylinder, being of a solid, rigid substantially round material, having a predetermined length and diameter, wherein said rotating mounting cylinder having a notch with a predetermined length and depth;

(c) a plurality of fixed rotating mounting sleeves, having a substantially round hollow interior, said sleeves being of substantially straight, rigid material, having at least one open end, said sleeves having a predetermined interior diameter and length that will slide over said rotating mounting cylinder, wherein said fixed rotating mounting cylinder sleeves having at least one hole to accept a male-threaded fastener, and at least one hole to accept a fastening means to secure said fixed mounting cylinder sleeves to said base plate;

(d) at least one fliparm being of a rigid material, having a predetermined length, width and thickness, wherein said fliparm arm having at least one hole on one end of said arm; and a fastening means to fasten said arm to said rotating mounting cylinder;

(e) at least one female-threaded receiver for receiving one of at least one said male-threaded fastener;

(f) a means for securing at least one said female-threaded receiver in place when said receiver is threadably receiving and securing said male-threaded fastener; and (g) at least one male-threaded fastener, whereby said sliding fliparm router stop is secured and released on one of at least one said fliparm router stop track mounted on at least one said sliding guide rail.

18. The dadoing system of claim 11 wherein said sliding guide rail stops further comprising:

(a) at least one hole in each said stop to receive a male-threaded fastener of sufficient length being slidably engaged with said first or second tracks;

(b) at least one female-threaded receiver for receiving said male-threaded fastener;

(c) at least one male-threaded fastener;

(d) a means for securing said female-threaded receiver in place when said female-threaded receiver is threadably receiving and securing said male-threaded fastener; whereby allowing said sliding guide rail stops to be secured during use and slidably adjustable when released.

19. The dadoing system in claim 11

Wherein said sliding channel clamp further comprising:

(a) a plurality of countersunk holes having a predetermined depth, diameter and location, having a hole to accept a male-threaded fastener, wherein each said male-threaded fastener is slidably engaged with one of said sliding channel clamp tracks;

(b) a plurality of female-threaded receivers for receiving said male-threaded fasteners;

(c) a means for securing said female-threaded receivers in place when said female-threaded receivers are threadably receiving and securing said male-threaded fasteners;

(d) at least one male-threaded fasterer; and (e) said sliding channel clamp being slidably engaged with said sliding channel clamp tracks; whereby said channel clamp slides in a transverse direction allowing workpieces of different widths to be secured on said major upper surface of said base.

20. The dadoing system of claim 11 wherein said risers being higher than said sliding channel clamp tracks; said risers allow a workpiece to be secured above said tracks, whereby debris from the workpiece being thrown between said risers allowing said sliding channel clamp to slide above the debris.

* * * * *